US010201167B2

(12) United States Patent
Murphy

(10) Patent No.: US 10,201,167 B2
(45) Date of Patent: Feb. 12, 2019

(54) SYSTEMS AND METHODS FOR PRODUCING IRREGULAR MEAT CHUNKS

(71) Applicant: Campbell Soup Company, Camden, NJ (US)

(72) Inventor: Rong Yan Murphy, Fayetteville, AR (US)

(73) Assignee: Campbell Soup Company, Camden, NJ (US)

( * ) Notice: Subject to any disclaimer, the term of this patent is extended or adjusted under 35 U.S.C. 154(b) by 0 days.

(21) Appl. No.: 15/854,101

(22) Filed: Dec. 26, 2017

(65) Prior Publication Data

US 2018/0177204 A1    Jun. 28, 2018

Related U.S. Application Data

(60) Provisional application No. 62/439,656, filed on Dec. 28, 2016.

(51) Int. Cl.
*A22C 17/00* (2006.01)
*A22C 18/00* (2006.01)

(52) U.S. Cl.
CPC ............ *A22C 17/002* (2013.01); *A22C 18/00* (2013.01)

(58) Field of Classification Search
CPC ....... A22C 17/00; A22C 17/006; A22C 17/02; A22C 17/0026; A22C 17/0033; A47J 43/044
USPC .................................................. 452/149, 155
See application file for complete search history.

(56) References Cited

U.S. PATENT DOCUMENTS

| | | |
|---|---|---|
| 3,183,775 A | 5/1965 | Robison et al. |
| 3,604,339 A | 9/1971 | Beck et al. |
| 3,615,692 A | 10/1971 | Kenneth et al. |
| 3,635,731 A | 1/1972 | Charles et al. |
| 3,813,775 A | 6/1974 | Fitzgerald et al. |
| 3,817,138 A | 6/1974 | Lasker et al. |
| 3,823,442 A | 7/1974 | Ferrara et al. |
| 3,924,295 A | 12/1975 | Verburg et al. |
| 3,924,296 A | 12/1975 | Wilkerson |

(Continued)

OTHER PUBLICATIONS

"DiversaCut 2110A Dicer," Specification sheet downloaded from Urschel website Jan. 16, 2018 URL <https://www.urschel.com/machines/DiversaCut-2110A8482-Dicer/> (2 pages).

*Primary Examiner* — Richard T Price, Jr.
(74) *Attorney, Agent, or Firm* — Pauly, DeVries Smith & Deffner LLC

(57) ABSTRACT

Embodiments herein include systems and methods for forming meat products into chunks. In an embodiment, a system for producing irregular shredded meat pieces from a meat log is included. The system can include a conveying mechanism, a first rotational shredding shaft positioned adjacent to the conveying mechanism, a first plurality of shredding fingers connected to the first rotational shredding shaft, a second rotational shredding shaft positioned adjacent to the conveying mechanism, and a second plurality of shredding fingers connected to the second rotational shredding shaft. The first and second rotation shredding shafts configured to rotate in directions opposite from one another. In some embodiments, the system can also include a cutting blade disposed downstream from the first and second rotational shredding shafts. Other embodiments are also included herein.

20 Claims, 12 Drawing Sheets

(56) References Cited

U.S. PATENT DOCUMENTS

| | | |
|---|---|---|
| 4,023,735 A | 5/1977 | Schnell et al. |
| 4,036,997 A | 7/1977 | Verburg et al. |
| 4,080,682 A | 3/1978 | Blaire et al. |
| 4,137,605 A | 2/1979 | Van Rij et al. |
| 4,186,216 A | 1/1980 | Roth et al. |
| 4,189,928 A | 2/1980 | Cerny et al. |
| 4,197,613 A | 4/1980 | Whiteley et al. |
| 4,205,414 A | 6/1980 | Ueno et al. |
| 4,210,677 A | 7/1980 | Huffman et al. |
| 4,229,859 A | 10/1980 | Gagliardi et al. |
| 4,257,144 A | 3/1981 | Takegoshi et al. |
| 4,271,563 A | 6/1981 | Theuman et al. |
| 4,280,618 A | 7/1981 | Jensen et al. |
| 4,409,704 A | 10/1983 | Seiffhart |
| 4,417,434 A | 11/1983 | Piereder et al. |
| 4,437,208 A | 3/1984 | Sampson et al. |
| 4,442,741 A | 4/1984 | Brahler et al. |
| 4,446,779 A | 5/1984 | Hubbard et al. |
| 4,494,356 A | 1/1985 | Takiguchi et al. |
| 4,535,507 A | 8/1985 | Reinke et al. |
| 4,567,050 A | 1/1986 | Roth et al. |
| 4,714,618 A | 12/1987 | Matsuda et al. |
| 4,730,368 A | 3/1988 | Townsend |
| 4,776,064 A | 10/1988 | Lobiondo et al. |
| 4,864,922 A | 9/1989 | Higashimoto et al. |
| 4,943,442 A | 7/1990 | Schack et al. |
| 4,947,517 A | 8/1990 | Boekel et al. |
| 4,984,513 A | 1/1991 | Choquette |
| 4,999,204 A | 3/1991 | Gibson et al. |
| 5,030,163 A | 7/1991 | Mielnik |
| 5,108,344 A | 4/1992 | Debey et al. |
| 5,173,075 A | 12/1992 | Wadell et al. |
| 5,332,593 A | 7/1994 | Suzuki et al. |
| 5,437,886 A | 8/1995 | Jolley et al. |
| 5,674,550 A | 10/1997 | Nutt et al. |
| 5,775,986 A * | 7/1998 | Law ............... A22C 9/005 366/294 |
| 5,887,415 A | 3/1999 | Matthews et al. |
| 5,928,072 A | 7/1999 | Fulcher et al. |
| 5,928,705 A | 7/1999 | Matthews et al. |
| 5,972,398 A | 10/1999 | Ludwig et al. |
| 5,976,003 A | 11/1999 | Rattmann et al. |
| 6,248,013 B1 | 6/2001 | Thomas et al. |
| 6,280,311 B1 | 8/2001 | Kuck et al. |
| 6,306,446 B1 | 10/2001 | Matthews et al. |
| 6,428,838 B1 | 8/2002 | Gagliardi, Jr. et al. |
| 6,596,330 B1 | 7/2003 | Roser et al. |
| 6,669,546 B2 | 12/2003 | Long et al. |
| 7,011,575 B2 | 3/2006 | Smarsh et al. |
| 7,040,976 B2 | 5/2006 | Groneberg-Nienstedt et al. |
| 7,090,881 B2 | 8/2006 | Lhoutellier et al. |
| 7,131,905 B2 | 11/2006 | Johnson |
| 7,195,554 B2 | 3/2007 | Hayakawa et al. |
| 7,377,021 B2 * | 5/2008 | Mauermann ......... B21J 15/025 29/521 |
| 7,404,759 B2 | 7/2008 | Sato et al. |
| 7,431,230 B2 * | 10/2008 | McPherson ......... A61F 2/4644 241/169 |
| 7,479,296 B2 | 1/2009 | Gagliardi |
| 7,521,077 B2 * | 4/2009 | Azzar .................. A22C 7/00 426/513 |
| 7,524,241 B2 | 4/2009 | Markert et al. |
| 7,569,245 B2 | 8/2009 | Salman et al. |
| 7,632,176 B2 | 12/2009 | Boulanger et al. |
| 7,666,075 B1 | 2/2010 | Baker et al. |
| 7,740,528 B1 | 6/2010 | Gagliardi, Jr. et al. |
| 7,771,254 B2 | 8/2010 | Nunn et al. |
| 8,070,567 B2 | 12/2011 | Umino et al. |
| 8,096,860 B2 | 1/2012 | Bolte et al. |
| 8,178,143 B2 | 5/2012 | Ogneva et al. |
| 8,408,108 B2 | 4/2013 | Redemann et al. |
| 8,469,299 B2 * | 6/2013 | Mandeville ......... A47J 43/0711 241/169.1 |
| 8,485,871 B2 | 7/2013 | Bolte et al. |
| 8,500,523 B1 | 8/2013 | Bauer et al. |
| 8,529,321 B2 | 9/2013 | Weber |
| 8,579,684 B2 | 11/2013 | Grasselli et al. |
| 8,632,380 B2 | 1/2014 | Stooker et al. |
| 8,764,525 B2 | 7/2014 | Peters et al. |
| 8,981,897 B2 | 3/2015 | Alsafar |
| 8,986,080 B2 | 3/2015 | Lauritzen et al. |
| 9,095,146 B2 | 8/2015 | Sigurdsson et al. |
| 9,155,316 B2 | 10/2015 | Souli et al. |
| 9,320,287 B2 | 4/2016 | Peters et al. |
| 9,351,497 B1 | 5/2016 | Parkman |
| 2007/0037503 A1 | 2/2007 | Johnson et al. |
| 2007/0298147 A1 | 12/2007 | Haus et al. |
| 2008/0026684 A1 | 1/2008 | Tomcak et al. |
| 2008/0038426 A1 | 2/2008 | Groneberg-Nienstedt et al. |
| 2008/0045131 A1 | 2/2008 | Neumann et al. |
| 2008/0261504 A1 | 10/2008 | Busch et al. |
| 2009/0220660 A1 | 9/2009 | Meunier et al. |
| 2010/0166931 A1 | 7/2010 | Pitt et al. |
| 2011/0111106 A1 | 5/2011 | Pivik et al. |
| 2011/0229612 A1 | 9/2011 | Kou et al. |
| 2011/0293817 A1 | 12/2011 | Hurm et al. |
| 2012/0009857 A1 | 1/2012 | Harden et al. |
| 2012/0252336 A1 | 10/2012 | Haythornthwaite et al. |
| 2012/0276827 A1 | 11/2012 | Borkiewicz et al. |
| 2014/0048633 A1 | 2/2014 | Thomas et al. |
| 2014/0154964 A1 | 6/2014 | Ensley et al. |
| 2014/0272008 A1 | 9/2014 | Wilson et al. |
| 2015/0108259 A1 | 4/2015 | Metcalf |
| 2015/0216192 A1 | 8/2015 | Jacobsen |
| 2016/0037788 A1 | 2/2016 | Corbin et al. |
| 2016/0066602 A1 | 3/2016 | Smith et al. |
| 2016/0088851 A1 | 3/2016 | Bauer |
| 2016/0262408 A1 | 9/2016 | Kennedy |

\* cited by examiner

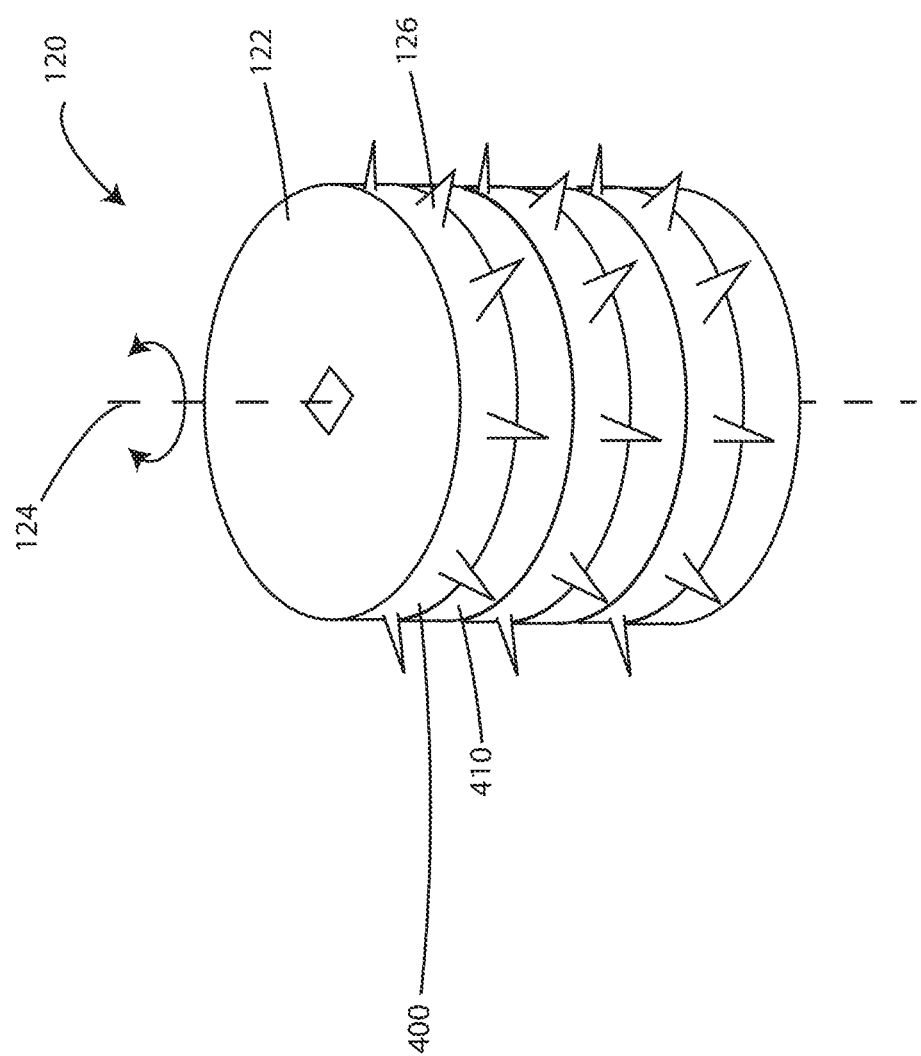

SYSTEMS AND METHODS FOR PRODUCING IRREGULAR MEAT CHUNKS

This application claims the benefit of U.S. Provisional Application No. 62/439,656, filed Dec. 28, 2016, the content of which is herein incorporated by reference in its entirety.

FIELD

Embodiments herein relate to the mechanical processing of meat products. More specifically, embodiments herein relate to the forming of meat products into chunks.

BACKGROUND

Meats are a cornerstone of diets around the world. Meats are included in many different types of dishes including soups, baked items, casseroles, sauces, and the like.

Meats must frequently be cut into discrete chunks or pieces as a part of food preparation processes. When this is performed by hand, the meat pieces are frequently somewhat irregular in terms of sizes and shapes. However, when this is done on a larger scale by a piece of industrial equipment, the meat pieces are generally highly uniform in terms of size and shape. Also, consumers typically associate highly uniform meat pieces with factory prepared food instead of home-made food.

SUMMARY

Embodiments herein include systems and methods for forming meat products into chunks. In an embodiment, a system for producing irregular shredded meat pieces from a meat log is included. The system can include a conveying mechanism, a first rotational shredding shaft positioned adjacent to the conveying mechanism, a first plurality of shredding fingers connected to the first rotational shredding shaft, a second rotational shredding shaft positioned adjacent to the conveying mechanism, and a second plurality of shredding fingers connected to the second rotational shredding shaft. The first and second rotation shredding shafts configured to rotate in directions opposite from one another. In some embodiments, the system can also include a cutting blade disposed downstream from the first and second rotational shredding shafts.

In an embodiment, a method for producing irregular shredded meat pieces from a meat log is included. The method can include disposing a meat log onto a conveying mechanism and shredding the meat log using shredding fingers mounted to opposed rotational shredding shafts. The rotational shredding shafts can each have a major axis disposed approximately parallel to a direction of motion of the conveying mechanism. The method can also include passing the shredded meat log through a cutting blade disposed downstream from the opposed rotational shredding shafts to form discrete irregular shredded meat pieces.

In an embodiment, a system for producing irregular-shaped meat pieces is included. The system can include a conveying mechanism, a first rotational shaft extending along a machine direction of the conveying mechanism, a first plurality of fingers protruding from the first rotational shaft, a second rotational shaft extending along the machine direction of the conveying mechanism, a second plurality of fingers protruding from the second rotational shaft, the first rotational shaft and the second rotational shaft each configured to rotate in a direction opposite from the other. The system can also include a rotational cutting mechanism disposed downstream from the first and second rotational shredding shafts, the cutting mechanism configured to rotate in a direction other than along the machine direction of the conveying mechanism.

In an embodiment, a system for producing irregular shredded meat pieces from a meat log is included. The system can include a conveying mechanism, a first shaft, a first plurality of fingers connected to the first shaft, a second shaft, and a second plurality of fingers connected to the second shaft. The first and second shafts can be configured to rotate such that the first plurality of fingers and the second plurality of fingers diverge in a cross-machine direction at a shredding position adjacent to the conveying mechanism. The system can further include a cutting mechanism disposed downstream from the first and second shafts, the cutting mechanism configured to cut irregular meat pieces from a shredded meat log.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood relating to the following drawings, in which:

FIG. 4 is a schematic perspective view of a cutting mechanism in accordance with various embodiments herein.

While embodiments are susceptible to various modifications and alternative forms, specifics thereof have been shown by way of example and drawings, and will be described in detail. It should be understood, however, that the scope herein is not limited to the embodiments described. On the contrary, the intention is to cover modifications, equivalents, and alternatives falling within the spirit and scope herein.

DETAILED DESCRIPTION

Consumers typically associate highly uniform meat pieces with factory prepared food instead of home-made food. Unfortunately, most current industrial devices for cutting meat into pieces produce highly uniform meat pieces in terms of size and shape.

Embodiments of systems herein can consistently form meat chunks having irregular shapes and sized rapidly and within repeatable boundaries. The irregular meat chunks formed by the systems herein have a homemade appearance that consumers find visually appealing in various food products.

Figure 1A:
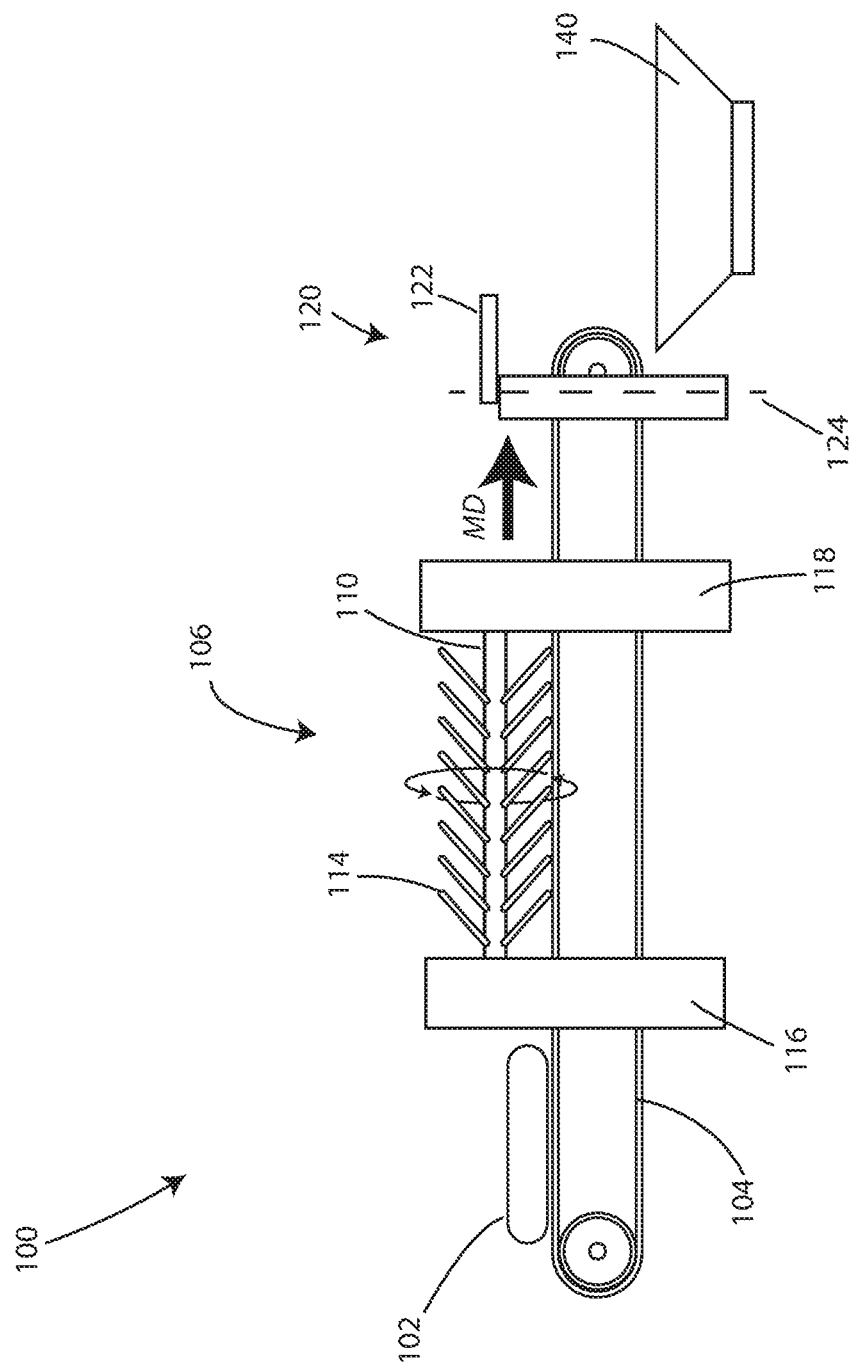
FIG. 1A is a schematic side view of a meat processing system in accordance with various embodiments herein.
Figure 1B:
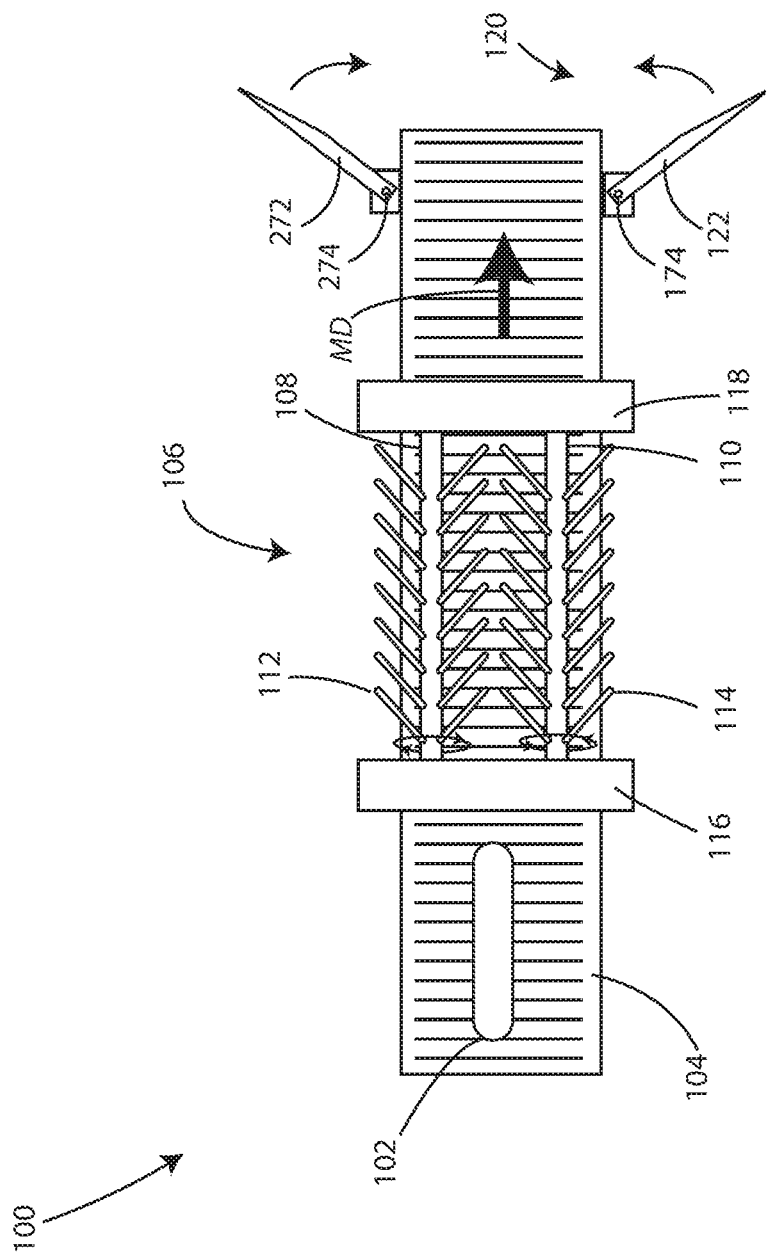
FIG. 1B is a schematic top view of a meat processing system in accordance with various embodiments herein.

Referring now to FIGS. 1A and 1B, a schematic side view is shown of a meat processing system 100 in accordance with various embodiments herein. The meat processing system 100 is generally used to form chunks of meat material. The meat processing system 100 can mechanically separate a larger portion of meat material into the formed meat chunks. The meat processing system 100 can be configured to produce meat chunks of random and irregular sizes, shapes, and masses, as will be described further herein. The meat processing system 100 can be configured to produce meat chunks having a home-made appearance, as will be described further herein.

The source of meat material to be processed by the meat processing system 100 can be a meat log 102. The meat log 102 can be a continuous or discrete mass of meat material that is to be processed into meat chunks. The meat log 102 is generally a cohesive mass of meat material including portions of whole-muscle meat material. The meat processing system 100 can include a conveying mechanism 104 for conveying the meat log 102 through the system. The conveying mechanism 104 can include a conveyor belt for carrying the meat log 102 and the resulting meat chunks through the system. The conveying mechanism 104 generally carries meat material through the meat processing system in a machine direction md. Although the meat processing system 100 shown schematically in FIGS. 1A and 1B has a linear, unvarying machine direction, a machine direction as used herein refers to the instant direction of a meat log as it is conveyed through a particular region of a processing system.

The meat processing system 100 includes a shredding mechanism 106. The shredding mechanism 106 is configured to separate a discrete or continuous meat log 102 in a cross-machine direction generally transverse to the machine direction md of the meat log 102. In some embodiments, the shredding mechanism 106 separates portions of a meat log 102 in a cross-machine direction such that portions of meat material are partially separated from the meat log 102. In some embodiments, the shredding mechanism 106 separates portions of a meat log 102 in a cross-machine direction such portions of meat material are completely separated from each other. In some embodiments, the shredding mechanism 106 is configured to separate whole-muscle meat pieces of a meat log into smaller discrete portions. In some embodiments, the shredding mechanism 106 is configured to separate whole-muscle meat pieces of a meat log into smaller discrete portions having irregular shapes and sizes.

The output of the shredding mechanism 106, which in the various embodiments can be characterized by varying degrees of cohesiveness or separation, can be referred to as a "shredded meat log." The term "shredded" does not limit the output of the shredding mechanism 106 to meat formations having a length dimension in the machine direction that is longer than other dimensions, but more generally to the separation of the meat material in a cross-machine direction substantially transverse to the machine direction md of a meat log. The characteristics of a shredded meat log can vary with the intended use of the meat chunks produced by the meat processing system 100. In some embodiments, the shredding mechanism 106 produces a shredded meat log that is substantially in a final form for use by a downstream process. In some embodiments, the shredding mechanism 106 produces a shredded meat log that requires further separation to form meat chunks suitable for use in a downstream process.

The shredding mechanism 106 includes a structure for physically interfacing with a meat log 102. The meat-interfacing structure can include a plurality of shredding fingers or rods for contacting a meat log 102 and shredding or otherwise separating it into smaller portions. The shredding mechanism 106 has a first rotational shaft 108 and a second rotational shaft 110. Connected to the first rotational shaft 108 is a first plurality of fingers 112. Connected to the second rotational shaft 110 is a second plurality of fingers 114. The first plurality of fingers 112 and the second plurality of fingers 114 are configured to interface with and mechanically process a meat log 102. The first rotational shaft 108 and the second rotational shaft 110 are configured to rotate such that the first plurality of fingers 112 and the second plurality of fingers 114 interface with a meat log 102 in a desired fashion. The first rotational shaft and second rotational shaft 110 can take on various shapes in cross-section including, but not limited to, cylindrical, triangular, or polygonal.

The shredding fingers of the first and second pluralities of shredding fingers 112 and 114 can be configured variously. The length of a rotational shaft and the axial and radial spacing of the fingers mounted thereon influence the shredding action performed on a meat log 102. Furthermore, different types of fingers and their distribution on a rotational shaft also influence the shredding action performed on a meat log 102. For example, fingers employed by a shredding mechanism can be any of blunt, sharpened serrated, notched, and scalloped, bars, or blades. The shredding fingers 112, 114 can take on various shapes in cross-section including, but not limited to, rods having cylindrical, triangular, or polygonal cross-sections and can be of varying angles, lengths and off-sets.

Additionally, shredding fingers can protrude from rotational shafts normally outwardly, at least partially in a downstream machine direction, at least partially in an upstream direction, or any combination thereof. Although the first and second pluralities of shredding fingers 112 and 114 shown in FIGS. 1A and 1B protrude from the first and second rotational shafts 108 and 110 partially in the downstream machine direction, other finger orientations are possible and will be discussed further herein.

The first rotational shaft 108 and the second rotational shaft 110 are generally positioned such that a major axis of each runs substantially along or approximately parallel to the machine direction md of the conveying mechanism. The first and second rotational shafts 108 and 110 can be mounted to one or more upstream mounting structure 116 and one or more downstream mounting structure 118, which are configured to mount the shafts in a desired orientation. The upstream mounting structure 116 and downstream mounting structure 118 can be part of a unitary frame in some embodiments. Among many factors, the orientation of the first and second rotational shafts 108 and 110, the first and second pluralities of fingers 112 and 114, and the relative rotation and motion between these are all influential on the mechanical processing of meat logs 102 that are processed by the meat processing system 100. The various configurations will be described further herein.

The first and second rotational shafts 108 and 110 can be movably mounted to the upstream and downstream mounting structures 116 and 118. For example, the first and second rotational shafts 108 and 110 can be mounted to movable structures that allow then ends of the shafts to translate. In some embodiments, one or both of the first and second rotational shafts 108 and 110 can be selectively displaced. In some embodiments, one or both of the first and second rotational shafts 108 and 110 can reversibly move into an operating position. In some embodiments, one or both of the first and second rotational shafts 108 can be selectively displaced in response to a certain condition. In some embodiments, one or both of the first and second rotational shafts 108 and 110 can reversibly move into an operating position in response to the presence of a meat log. In some embodiments, one or both of the first and second rotational shafts 108 and 110 can selectively move to a certain position in response to detecting one or more of the presence, position, orientation, size, and shape of a meat log. More details relating to displaceable first and second rotational shafts 108 and 110 will be described further herein.

The first and second rotational shafts 108 and 110 illustrated by FIGS. 1A and 1B each have a major axis that is parallel to the machine direction md of the conveying mechanism 104. In some embodiments, the first rotational shaft 108 and the second rotational shaft 110 are parallel to each other. In some embodiments, the first rotational shaft 108 and the second rotational shaft 110 rotate in directions opposite from each other, as shown by the directional arrows. In some embodiments, the opposite rotation is such that the first and second pluralities of fingers 112 and 114 both move downward toward a center of the conveying mechanism 104 and sweep outward in a cross-machine direction near the conveying mechanism 104. In such embodiments, the shredding fingers are configured to interact with a meat log 102 by providing a downward (toward the conveying mechanism 104) and outward force there to. Such downward and outward transverse interaction can cause separation or shredding of meat from the meat log 102 to form a shredded meat log. Finger orientations, structures, and configurations will be described further herein.

Figure 2:
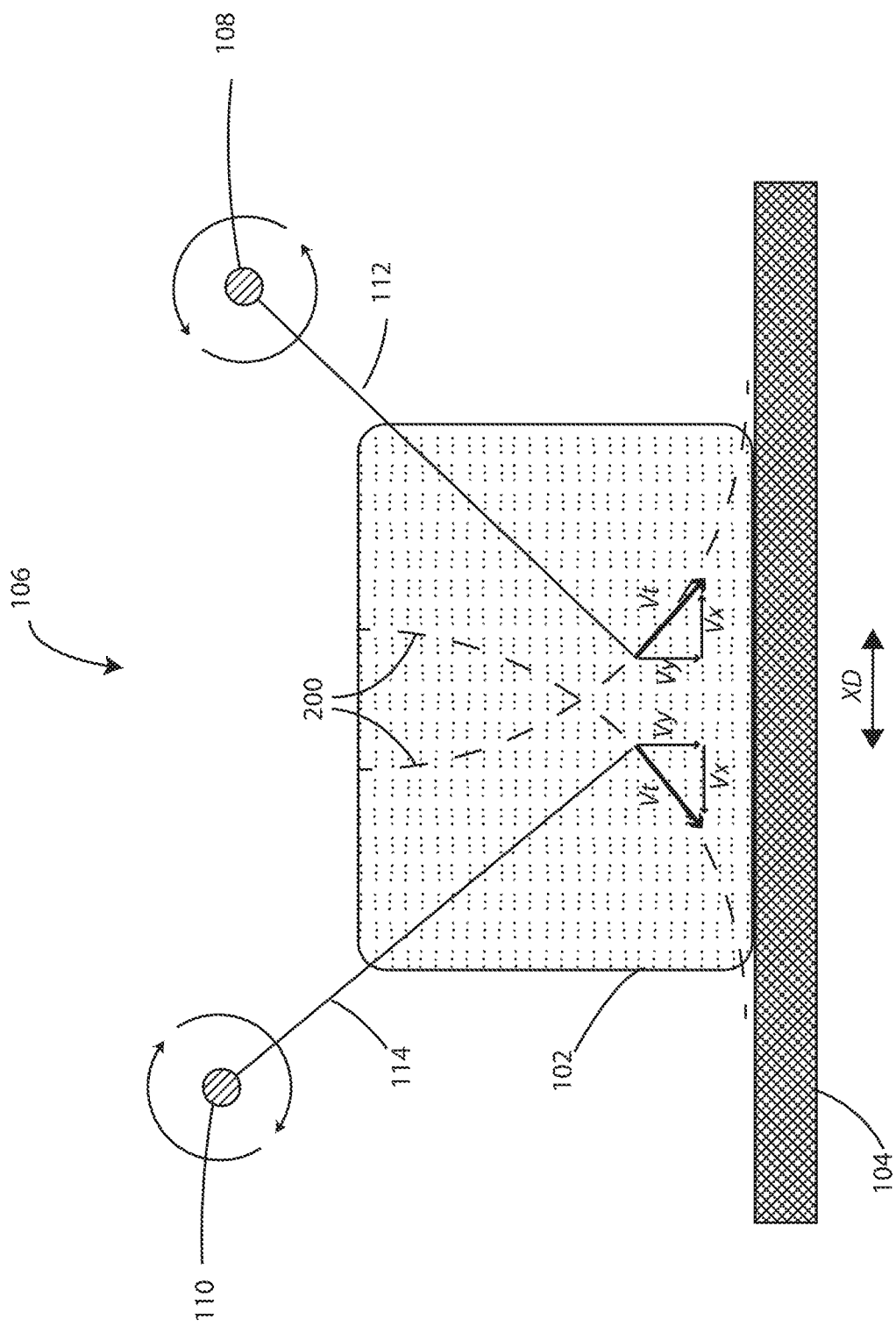
FIG. 2 is a schematic cross-sectional view of a meat processing system in accordance with various embodiments herein.

Referring now to FIG. 2, a schematic cross-sectional view is shown of a shredding mechanism 106 interacting with a meat log 102. The first and second rotational shafts 108 and 110 rotate in opposite directions, as indicated by the directional arrows. The first and second pluralities of fingers 112 and 114 define arcs 200 as they are rotated. Directional vector arrows shown at the tips of the first and second fingers 112 and 114 show the tangential direction of motion $V_t$ of the finger tips as they are rotated through the arcs 200. The downward vertical direction component $V_y$ of the finger tips toward the conveying mechanism 104 and the outwardly separating, horizontal direction component $V_x$ in the cross-machine direction are also shown.

As meat log 102 passes through the arcs 200, the fingers penetrate the meat log and shred it from the inside-out. The vertical motion $V_y$ of the fingers applies a downward force to the meat log 102 that enables the first and second plurality of fingers 112 and 114 to penetrate the meat log. The horizontal motion $V_x$ of the fingers applies an outward force to the meat log 102 that enables it to be pulled outwardly. The pulling can separate individual portions meat from each other and from the cohesive log, and the shredding can further separate individual portions of meat into smaller meat chunks, as described above with reference to FIGS. 1A and 1B. Portions of the meat log 102 not lying within the arcs 200 of the first and second pluralities of fingers 112 and 114 can be separated by forces transmitted from adjacent regions of the meat log that interact with the fingers.

Downstream from the shredding mechanism 106, the meat processing system 100 includes a cutting mechanism 120. A cutting mechanism is generally configured to further separate or process of a meat log 102 as it exists after exiting the shredding mechanism 106 as a shredded meat log. In various embodiments, the cutting mechanism mechanically interfaces with a meat log 102 in a different manner than the shredding mechanism 106. For example, the cutting mechanism 120 can be configured to cut, abrade, or otherwise separate a meat log 102 in a direction other than the direction used by the shredding mechanism 106. In some embodiments, a cutting mechanism 120 can be used to dice a shredded meat log into discrete meat chunks. In some embodiments, the cutting mechanism includes a rotational meat interface structure configured to rotate about a major axis extending along direction other than the machine direction md.

In some embodiments, the cutting mechanism 120 includes a side-mounted elongated cutting blade 122. The side-mounted elongated cutting blade 122 is configured to rotate about a pivot 174 having a vertical axis with reference to the machine direction md. The side-mounted elongated cutting blade 122 can rotate toward the conveying mechanism 104 as depicted by the directional arrow. The side-mounted elongated cutting blade 122 can cut into a shredded meat log 102 so as to break up agglomerated portions of meat material, cut the shredded meat log 102 into halves, or otherwise separate the meat log 102 into meat chunks having their final form suitable for use in a downstream process. The cutting mechanism can include other meat interface structures in addition to or the alternative of a side-mounted elongated cutting blade 122. For example, a cutting mechanism can include a penetrating rod, blunt interface structure, scalloped interface structure, and serrated interface structure, among others disclosed herein. Various cutting mechanisms 120 will described further herein.

In some embodiments, the cutting mechanism 120 can also include a second side-mounted elongated cutting blade 272. The second side-mounted elongated cutting blade 272 is configured to rotate about a second pivot 274.

The meat processing system 100 can include a receiving structure 140 for downstream processing of the meat chunks produced by the system. For example, the receiving structure 140 can be a hopper, chute, conveying mechanism, or other collection system for receiving meat chunks for use in a downstream process. Some embodiments, the receiving structure 140 is an extension of the conveying mechanism 104. The receiving structure 140 is shown by way of example, and is not particularly limited.

Figure 3A:
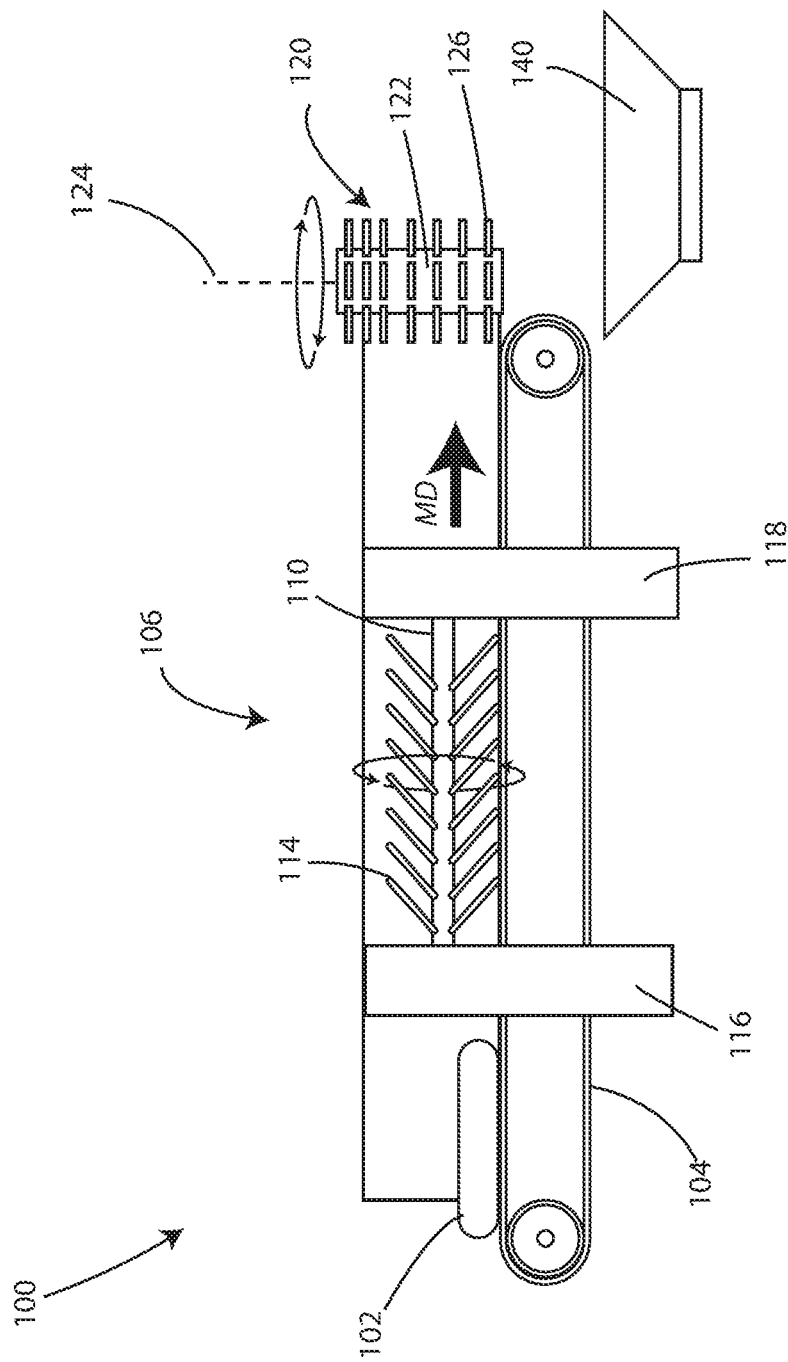
FIG. 3A is a schematic side view of a meat processing system in accordance with various embodiments herein.
Figure 3B:
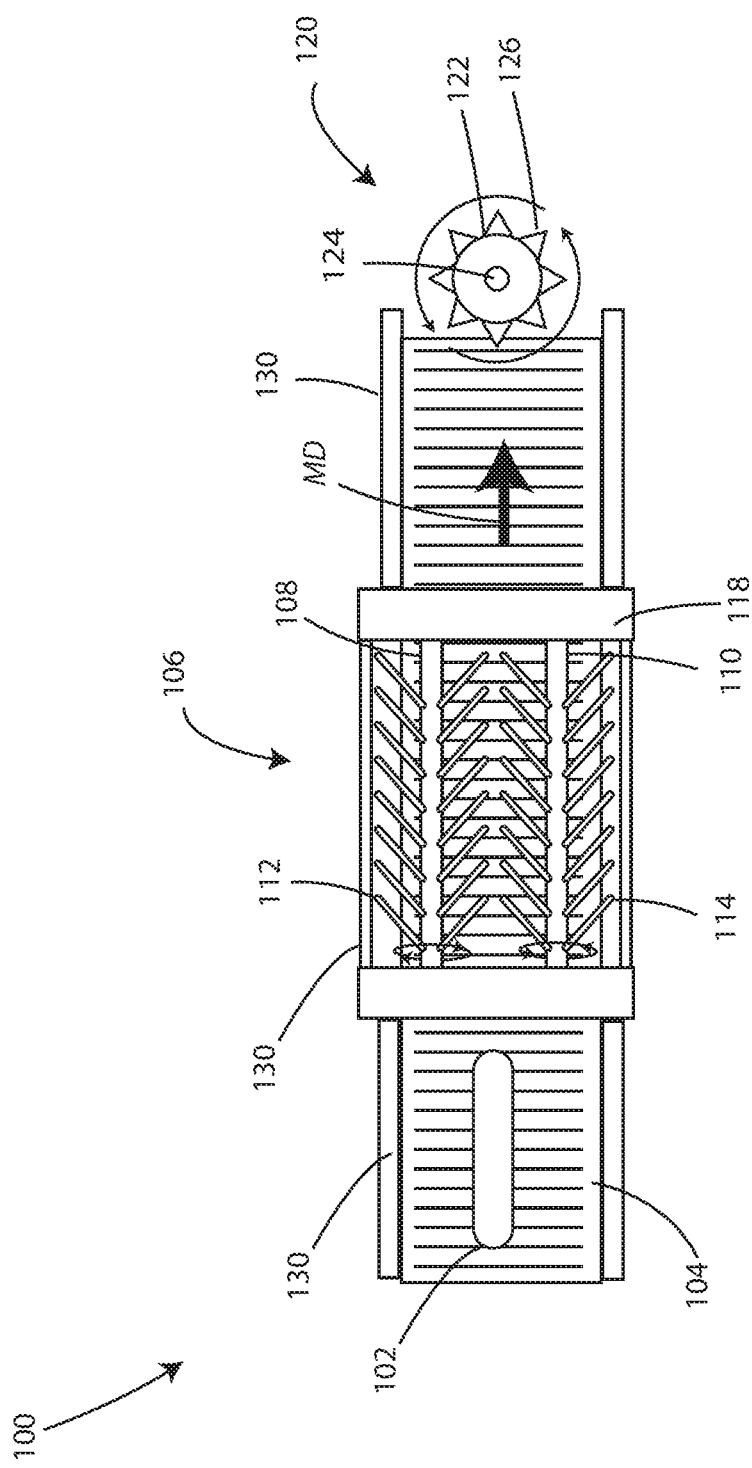
FIG. 3B is a schematic top view of a meat processing system in accordance with various embodiments herein.

Referring now to FIGS. 3A and 3B, a schematic view is shown of a meat processing system 100. The meat processing system 100 is illustrated with an exemplary barrier 130. The barrier 130 is a structure positioned along the sides of the conveying mechanism 104. The barrier 130 provides separation between a meat processing environment of the meat processing system 100 and an outside environment. The barrier 130 can prevent meat logs 102 and meat chunks from exiting the processing environment. The barrier 130 can further prevent outside contaminants from entering the processing environment. A barrier can include one or more side walls and in some embodiments a top. A barrier can fully partially enclose a processing environment of a meat processing system. A barrier can fully enclose a processing environment of a meat processing system. A barrier can form a tunnel through which meat logs are passed. A barrier can provide a bearing surface for meat logs throughout the various processing stages of a meat processing system. A barrier can be incorporated on any meat processing system disclosed herein.

The function of the cutting mechanism 120 of the meat processing system 100 depicted by FIGS. 3A and 3B can be functionally consistent with the cutting mechanisms described above with reference to FIGS. 1A and 1B. The cutting mechanism 120 includes a cutting wheel 123. The cutting wheel is configured to rotate about a major axis 124. A plurality of blades 126 are mounted to the cutting wheel. The blades 126 can be blunt, sharpened, scalloped, notched, serrated, and the like, as will be described further herein.

FIG. 4 depicts a schematic view of a cutting mechanism 120 having a cutting wheel 123. The cutting wheel can rotate uni-directionally or bi-directionally about its major axis 124. The cutting wheel has a plurality of radially-disposed blades 126 mounted thereto. In some embodiments, the blades 126 are mounted on a central shaft, but in some embodiments the blades 126 are mounted to blade disks 400.

In some embodiments, the blade disks can be separated by spacers 410. The spacers 410 can be of different heights such that the distance between adjacent blade disks can vary. In some embodiments, the stack of blade disks and spacers can be removed from one another and can be reconfigured as desired. However, in other embodiments, the stack of blade disks and spacers can be welded or otherwise permanently fastened together.

The blades 126 are configured to cut into a shredded meat log as it is conveyed towards the cutting mechanism 120. The dynamic pressure of meat material being conveyed through the meat processing system can provide the meat with a forward directed (in the direction of movement of the conveyor) force enabling the cutting wheel 123 to cut into the meat as it impinges upon the blades 126.

Figure 5:
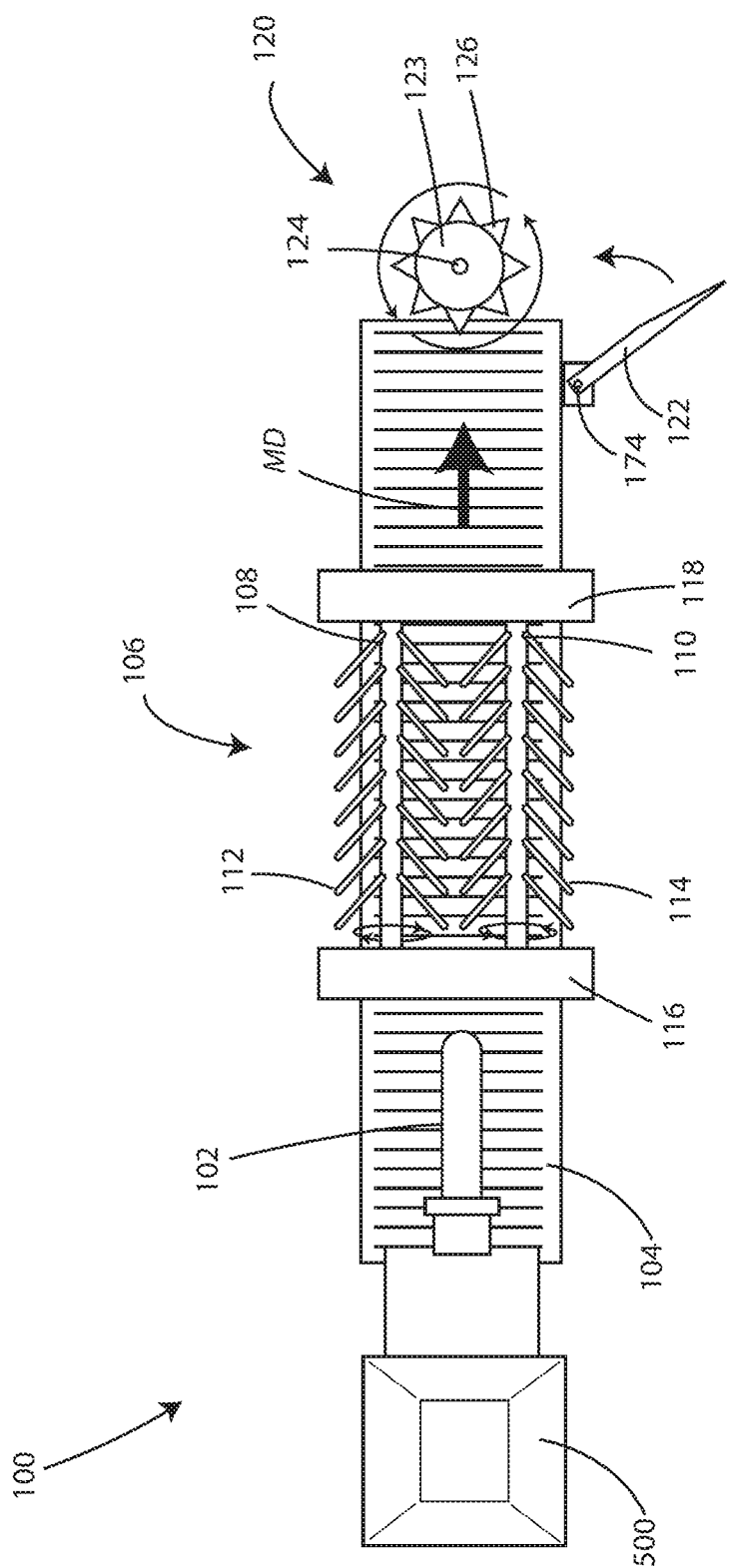
FIG. 5 is a schematic top view of a meat processing system in accordance with various embodiments herein.

In some embodiments, other pieces of equipment such as extruders and/or cookers can also be arranged and/or included with systems herein. Referring now to FIG. 5, a schematic top view is shown of a meat processing system 100 in accordance with various embodiments herein. The meat processing system 100 is shown along with a meat extruder 500. The meat extruder 500 can produce a meat log 102 for disposal on the conveying mechanism 104 of the meat processing system 100. The meat extruder 500 can continuously extrude a meat log onto the conveying mechanism 104. The meat extruder 500 can intermittently extrude discrete meat logs onto the conveying mechanism 104. In some embodiments, the meat extruder can form a cooked meat log from cooked meat pieces. In some embodiments, the meat extruder can form include a cooking device and can form a cooked meat log from uncooked meat pieces. The meat extruder 500 is a peripheral device that can optionally be included in the various meat processing systems 100 disclosed herein.

The meat processing system 100 has a shredding mechanism 106 consistent with the various shredding mechanisms disclosed herein. The shredding mechanism 106 illustrated in FIG. 5 has a first and second plurality of fingers 112 and 114 that are angled in an upstream machine direction. Various finger orientations will be discussed further herein. The cutting mechanism illustrated in FIG. 5 has both a side-mounted elongated cutting blade 122 and a cutting wheel 123. Various combinations and orientations of cutting blades and cutting wheels will be discussed further herein.

Methods

Figure 6:
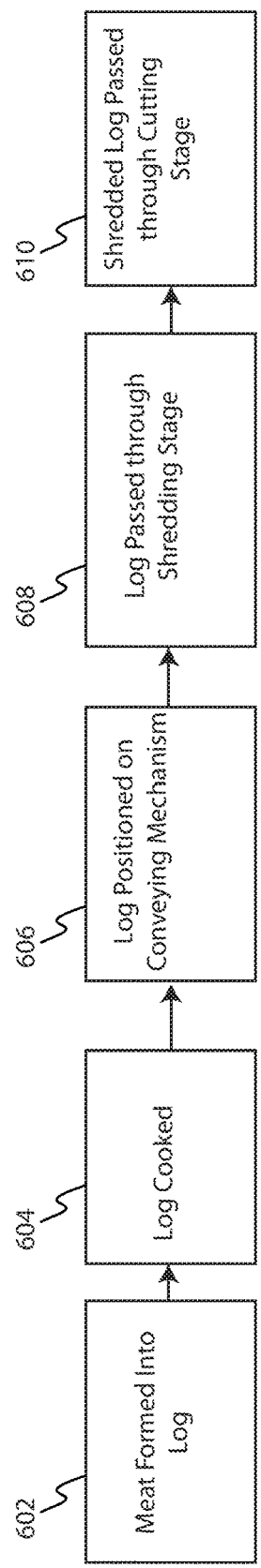
FIG. 6 is a block diagram of a method of processing meat in accordance with various embodiments herein.

Referring now to FIG. 6, a flow diagram of a method for producing irregular meat chunks in accordance with various embodiments herein is depicted. At a first step 602, meat is formed into a log. The source meat can include any meat or combination of meat material, such as chicken, turkey, pork, beef, lamb, goat, and fish. The meat material can be formed into a log by compressing meat material together, or by other methods described herein. At a step 604, the meat log is cooked. In some embodiments, the cooking step 604 is integrated with the meat log formation step 602. Cooking a meat log 604 can include cooking the meat log within a casing, chamber, or other vessel.

A cooked meat log can be introduced into the environment of a meat processing system in a step of positioning the log on a conveying mechanism 606. In this step, a cooked log can be extruded or disposed onto the conveying mechanism of a meat processing system. The log can be a discrete or continuous mass of meat material that is positioned onto a conveying mechanism. The one or more meat logs positioned on the conveying mechanism of a meat processing system are then conveyed through the processing system to be formed into discrete, irregular meat chunks. The first mechanical separation step is passing the meat log through a shredding stage 608. The shredding stage generally includes a shredding mechanism as described herein. After passing the meat log through the shredding stage, the meat log is passed through a cutting stage 610. The cutting stage generally includes a cutting mechanism as described herein.

Meat Interface Structures—Shredding Fingers and Cutting Blades

Referring now to FIGS. 7A-7F, a variety of meat interface structures are shown schematically. The meat interface structures described herein can be employed as meat interface structures of the various embodiments of meat processing systems disclosed herein, such as the shredding fingers and/or cutting mechanism blades.

Figure 7:
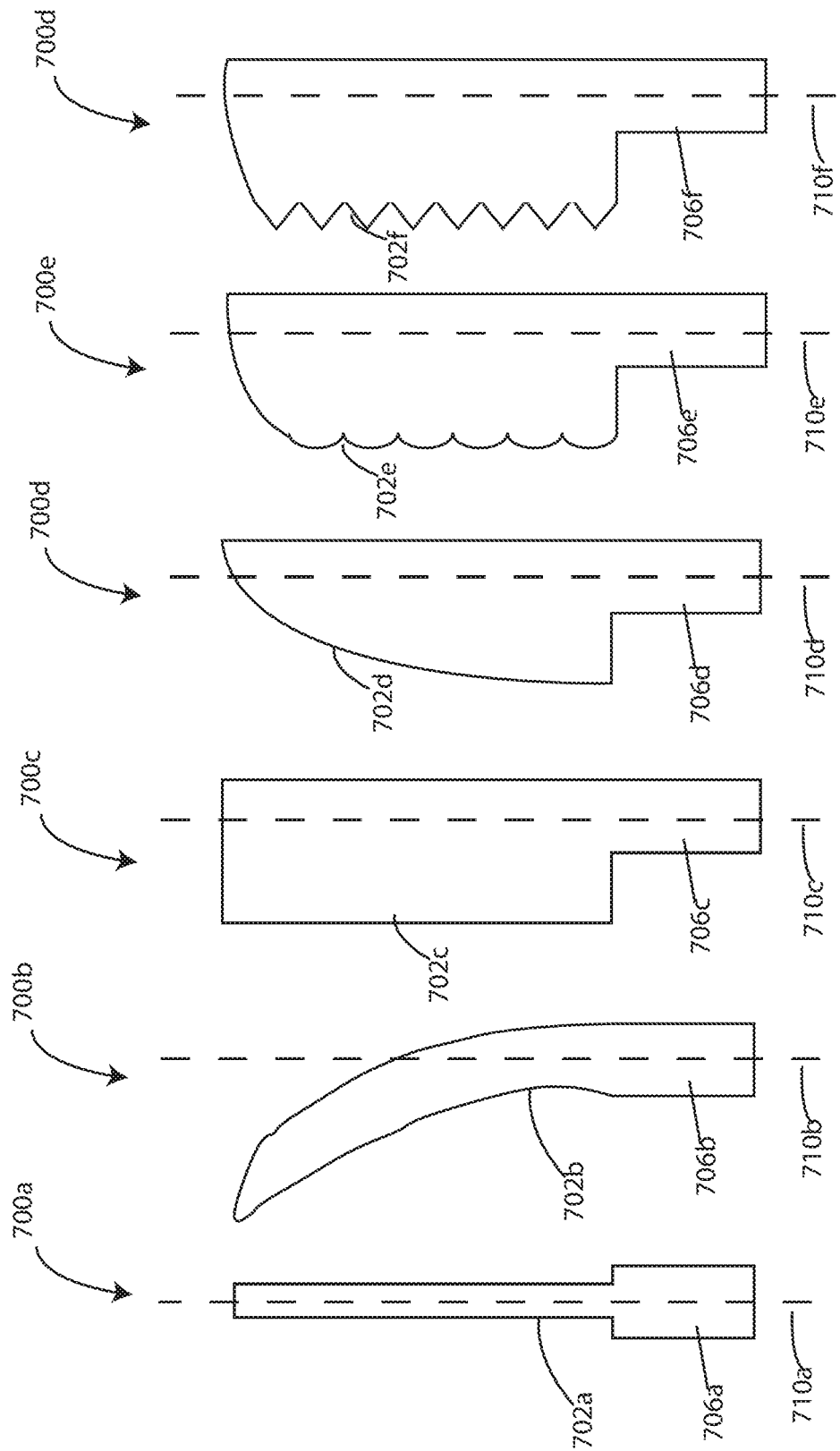
FIGS. 7A-7F are schematic views of meat interface structures in accordance with various embodiments herein.

FIG. 7A is a schematic view of a meat interface structure 700a. The meat interface structure 700a is configured as a straight finger. The meat interface structure 700a defines a root region (or base) 707a and a finger region 702a. The finger region 702a can be a cylindrical protrusion. The finger region 702a can be a protrusion having another geometrical shape, such as a polygonal prism, cone, or tapered polygonal prism. The meat interface structure 700a has a root 706a. The meat interface structure 700a has a major axis 710a extending through the root 706a.

FIG. 7B is a schematic view of a meat interface structure 700b. The meat interface structure 700b is configured as a claw. The meat interface structure 700b defines a root region 706b and a claw region 702b. The claw region 702b can be a cylindrical protrusion. The finger region 702b can be a protrusion having a curved shaft. The meat interface structure 700b has a root 706b. The meat interface structure 700b has a major axis 710b extending through the root 706b.

FIG. 7C is a schematic view of a meat interface structure 700c. The meat interface structure 700c is configured as a blunt blade. The meat interface structure 700c defines a root region 706c and a blunt blade region 702c. The blunt blade region 702c can be a thin protrusion having a blunt or dulled edge. In some embodiments, the blunt blade region 702c is a dulled blade. The meat interface structure 700c has a root 706c. The meat interface structure 700c has a major axis 710c extending through the root 706c.

FIG. 7D is a schematic view of a meat interface structure 700d. The meat interface structure 700d is configured as a sharpened blade. The meat interface structure 700d defines a root region 706d and a sharpened blade region 702d. The sharpened blade region 702d can be a thin protrusion having a sharpened edge. The meat interface structure 700d has a root 706d. The meat interface structure 700d has a major axis 710d extending through the root 706d.

FIG. 7E is a schematic view of a meat interface structure 700e. The meat interface structure 700e is configured as a scalloped blade. The meat interface structure 700e defines a root region 706e and a scalloped blade region 702e. The scalloped blade region 702e can be a thin protrusion having a sharpened scalloped edge. The scalloped blade region 702e can be a thin protrusion having a blunt or dulled scalloped edge. The meat interface structure 700e has a root 706e. The meat interface structure 700e has a major axis 710e extending through the root 706e.

FIG. 7F is a schematic view of a meat interface structure 700f. The meat interface structure 700f is configured as a notched blade. The meat interface structure 700f defines a root region 706f and a notched blade region 702f. The notched blade region 702f can be a thin protrusion having a sharpened notched edge. The scalloped blade region 702f can be a thin protrusion having a blunt or dulled notched edge. The meat interface structure 700f has a root 706f. The meat interface structure 700f has a major axis 710f extending through the root 706f.

The meat interface structures disclosed herein can be employed in the various shredding mechanisms and cutting mechanisms disclosed herein. The meat interface structures are generally configured to mechanically act on meat material, such as by cutting, pulling, abrasion, tearing, shredding, compressing, and the like. The meat interface structures can be constructed of various materials of sufficient strength to allow the structures to perform the desired mechanical act on a meat material. The interface structures can also be made of food-grade materials with low porosity that are readily sanitized and cleaned. Meat interface structures can be constructed of metals, polymers, ceramics, woods, glasses, stones, combinations thereof, and the like. Meat interface structures can be at least partially constructed of metals such as stainless steel, copper, steel, iron, aluminum, brass, bronze, zinc, alloys and combinations thereof, and the like. Meat interface structures can also be constructed at least partially of polymers such as PVC, PE, ABS, PTFE, PS, combinations thereof, and the like. In some embodiments, meat interface devices are constructed of a metal-plated metal. In some embodiments, meat interface devices are constructed of polymer-coated metal. In some embodiments, meat interface structures are constructed of a ceramic such as zirconium oxide.

The meat interface structures disclosed herein can be integral to a shredding mechanism or cutting mechanism. In some embodiments, the meat interface structures are configured as permanently attached fingers of a shredding mechanism. In some embodiments, the meat interface structures are configured as removably attached fingers of a shredding mechanism. In some such embodiments, the roots of the meat interface structure are configured to be received by a receptacle of one or more shafts of a meat shredding mechanism. In some embodiments, the meat interface structures are configured as permanently attached blades of a cutting mechanism. In some embodiments, the meat interface structures are configured as removably attached blades of a cutting mechanism. In some such embodiments, the roots of the meat interface structure are configured to be received by a receptacle of one or more shafts or structures of a cutting mechanism.

Shredding Mechanism Configurations

Figure 8:
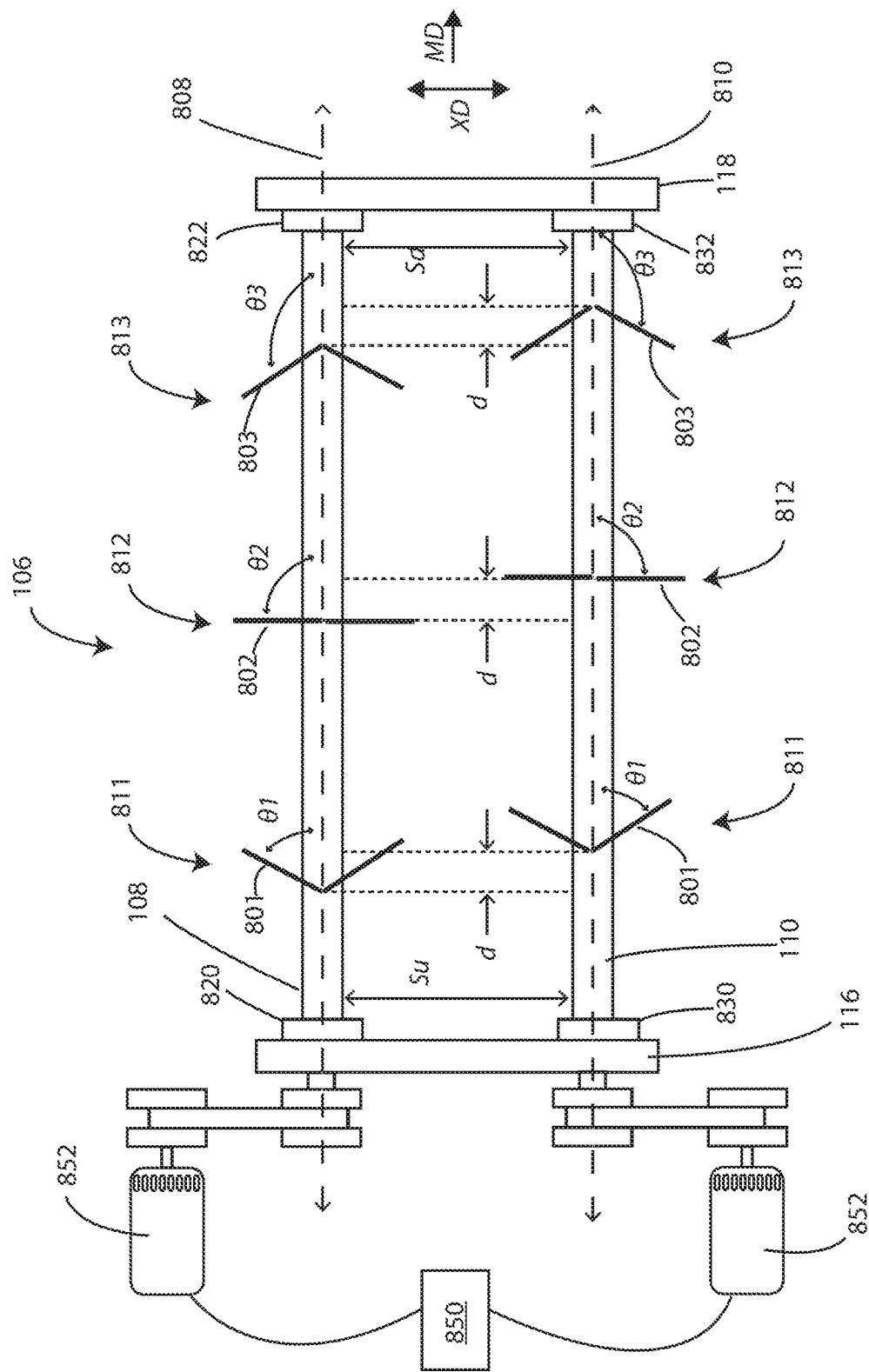
FIG. 8 is a schematic top view of a meat shredding mechanism in accordance with various embodiments herein.

Referring now to FIG. 8, a schematic top view is shown of a shredding mechanism 106 in accordance with various embodiments herein. The shredding mechanism 106 has a first shaft 108 having a first bank 811 of first fingers 801, a second bank 812 of second fingers 802, and a third bank 813 of third fingers 803. The shredding mechanism also has a second shaft 110 having a first bank 811 of first fingers 801, a second bank 812 of second fingers 802, and a third bank 813 of third fingers 803. The first shaft 108 has a first major axis 808. The second shaft 110 has a second major axis 810. The first shaft 108 is mounted to a first upstream mount 820 and a first downstream mount 822. The second shaft 110 is mounted to a second upstream mount 830 and a second downstream mount 832. The first and second upstream mounts 820 and 830 are mounted to an upstream mounting structure 116. The first and second downstream mounts 822 and 832 are mounted to a downstream mounting structure 118.

The first shaft 108 and the second shaft 110 are rotational shafts configured to rotate such that the fingers attached thereto can mechanically act on a meat log. In a meat-shredding process, the shafts can be rotated at like or disparate speeds. In some embodiments, the first shaft 108 is rotated at a higher speed than the second shaft 110. In some embodiments, the first shaft 108 is configured to rotate at the same speed as the second shaft 110. In some embodiments, the first shaft 108 is rotated at a lower speed than the second shaft 110. In some embodiments, one or both of the first and second rotational shafts 108 and 110 are rotated at a constant speed. In some embodiments, one or both of the first and second rotational shafts are rotated at varying speeds The speed of a rotating shaft is generally controlled by a speed controller 850. The speed controller 850 can control operation of electric motors 852 (or another device for creating motive force) and therefore control the absolute and relative rotational speed of the first rotational shaft 108 and the second rotational shaft 110 such that a desired shredding effect is created. In some embodiments, a speed controller causes one or more rotational shafts to rotate at a certain speed in response to a certain type of meat log being present on in a meat processing system. In some embodiments, a speed controller causes or more rotational shafts to rotate according to a predetermined shredding program. In some embodiments, a speed controller causes one or more rotational shafts to rotate at a random speed in order to provide a varied shredding action.

The rotational shredding shafts of the various embodiments can be rotated at various rates. In some embodiments, one or both shafts of a shredding mechanism can be rotated at any of the following rotational speeds: 0 revolutions per minute ("RPM"), 0.1 RPM, 0.5 RPM, 1 RPM, 2 RPM, 5 RPM, 10 RPM, 15 RPM, 20 RPM, 25 RPM, 30 RPM, 60 RPM, or 100 RPM. In some embodiments, one or both shafts of a shredding mechanism can be rotated at a rotational speed within a range, wherein the upper and lower bounds of the range can be defined by any combination of the following rotational speeds: 0 RPM, 0.1 RPM, 0.5 RPM, 1 RPM, 2 RPM, 5 RPM, 10 RPM, 15 RPM, 20 RPM, 25 RPM, 30 RPM, 60 RPM, or 100 RPM. In some embodiments, the rotational shredding shafts rotate at disparate speeds, wherein the difference in rotational speeds can be within a range wherein the upper and lower bounds of the range can be defined by any combination of the following percentages: 1%, 2%, 5%, 10%, 20%, 50%, 100%, 150%, and 200%. In some embodiments, the first and second rotational shafts rotate in opposite directions. In some embodiments, the first and second rotational shafts rotate in the same direction.

The fingers mounted to the first shaft 108 and the second shaft 110 are shown with different orientations with respect to the shafts to illustrate the different possible configurations consistent with the various embodiments herein. Generally, a finger protrudes from a shaft at a finger angle θ defined between a major axis of the finger and a downstream end of a major axis of the shaft. Each first finger 801 of the first bank of fingers 811 of the first shaft 108 define an acute finger angle $\theta_1$ with the first shaft 108. An acute finger angle indicates that the finger points at least partially toward a downstream end of the shaft to which it is mounted. Each first finger 801 of the first bank of fingers 811 of the second shaft 110 defines an acute finger angle $\theta_1$ with the second shaft 110. Each second finger 802 of the second bank of fingers 812 of the first shaft 108 defines a right finger angle $\theta_2$ with the first shaft 108. A right finger angle indicates that the finger points normally outwardly from a shaft, or in other words is a straight finger. Each second finger 802 of the second bank of fingers 812 of the second shaft 110 defines a right finger angle $\theta_2$ with the second shaft 110. Each third finger 803 of the third bank of fingers 813 of the first shaft 108 defines an obtuse finger angle $\theta_3$ with the first shaft 108. An obtuse finger angle indicates that the finger points at least partially toward an upstream end of the shaft to which it is mounted. Each third finger 803 of the third bank of fingers 813 of the second shaft 110 defines an obtuse finger angle $\theta_3$ with the second shaft 110.

In FIG. 8, the finger angles of the first fingers 801, the second fingers 802, and the third fingers 803 of the first shaft 108 are shown to be equal to the finger angles of their corresponding first fingers 801, second fingers 802, and third fingers 803 of the second shaft 110 for purposes of illustration, although this need not be the case. In some embodiments, at least corresponding fingers from each shaft have different finger angles. In some embodiments, at least some corresponding fingers from each shaft have equal finger angles. Similarly, while the fingers of each discrete bank on a shaft are shown to have equal finger angles for purposes of illustration, this need not be the case. In some embodiments, at least some of the fingers of each bank of fingers have unequal finger angles. In some embodiments, at least some of the fingers of each bank of fingers have equal finger angles.

The finger angles between shafts and fingers mounted thereto can be acute, right, or obtuse. Acute finger angles generally indicate a major axis of a finger projecting at least partially along a major axis of a shaft towards its downstream end, relative to the machine direction md. Right finger angles generally indicate a major axis of a finger projecting normally relative to a major axis of a shaft. Obtuse finger angles generally indicate a major axis of a finger projecting at least partially along a major axis of a shaft towards its upstream end, relative to the machine direction md. In some embodiments, one or more fingers of a shredding mechanism have a finger angle in a range corresponding to the following number of fingers, wherein each number can be defined the upper or lower boundary of the range: 10 degrees, 20 degrees, 30 degrees, 40 degrees, 45 degrees, 50 degrees 60 degrees, 70 degrees, 80 degrees, 90 degrees, 100 degrees, 110 degrees, 120 degrees, 130 degrees, 135 degrees, 140 degrees, 150 degrees, 160 degrees, and 170 degrees.

A finger bank is generally a cluster of one or more radially disposed fingers on a shaft mounted in axial proximity to each other. In some embodiments, all fingers of a finger bank are mounted at the same axial position. In some embodiments, some fingers of a finger bank are mounted at the same axial position. In some embodiments, fingers of a finger bank are mounted at the different axial positions. In some embodiments, a finger bank includes only 1 finger. In some embodiments, a finger bank includes more than 1 finger. In some embodiments, a finger bank includes many fingers in a range corresponding to the following number of fingers, wherein each number can be defined the upper or lower boundary of the range: 1 finger, 2 fingers, 3 fingers, 4 fingers, 5 fingers, 6 fingers, 7 fingers, 8 fingers, 9 fingers, 10 fingers, 15 fingers, 20 fingers, and greater than 20 fingers. The fingers of a finger bank can be distributed around the major rotational axis with an even angular spacing. In some embodiments, the fingers of a finger bank are distributed around the major rotational axis with an uneven angular spacing.

While the first and second shafts 108 and 110 of the schematically presented shredding mechanism 106 of FIG. 8 are shown each having three banks of fingers, shafts can be constructed in accordance with various embodiments herein having different numbers of banks. In some embodiments, a shaft of a shredding mechanism has one bank of fingers. In some embodiments, a shaft of a shredding mechanism has two banks of fingers. In some embodiments, a shaft includes several banks in a range corresponding to the following number of banks, wherein each number can be defined the upper or lower boundary of the range: 1 bank, 2 banks, 3 banks, 4 banks, 5 banks, 6 banks, 7 banks, 8 banks, 9 banks, 10 banks, 15 banks 20 banks, and greater than 20 banks. In embodiments incorporating more than one bank per shaft, the number of fingers per bank can be the same or different for some or all banks. In some embodiments, each shaft of a shredding mechanism has the same number of finger banks attached there to. In some embodiments, each shaft of a shredding mechanism has different numbers of finger banks attached there to.

The first bank 811 of the first shaft 108 can be axially aligned with the corresponding first bank 811 of the second shaft 110. In some embodiments, the first bank 811 of the first shaft 108 is not axially aligned with the corresponding first bank 811 of the second shaft 110. In such unaligned embodiments, the corresponding banks of the opposed first and second shafts 108 and 110 can be axially offset by an offset distance d. Similarly, any bank of the first shaft 108 corresponding to a bank of the second shaft 110 can be axially aligned. Any bank of the first shaft 108 corresponding to a bank of the second shaft 110 can be axially offset by an offset distance.

The fingers of a meat shredding mechanism are generally configured to shred meat in in an irregular but repeatable manner. In some embodiments, the fingers used on a shredding mechanism are all like. In some embodiments, at least some the fingers used on a shredding mechanism are different. The various fingers used can include any or all of the meat interface structured described above with reference to FIGS. 7A-7F. Various combinations of straight finger, claw, blunt blade, sharpened blade, scalloped blade, notched blade, or otherwise serrated blade can be employed by a shredding mechanism to mechanically act on a meat log in order to produce irregular meat chunks. Regular repeating or irregular patterns of finger types can be employed to produce a desired shredding or mechanical separating effect.

The first major axis 808 and the second major axis 810 can each be parallel with a machine direction md of a conveying mechanism of meat processing system to which the shredding mechanism 106 is a part. In some embodiments, the major axis of one or more of the first and second shafts 108 and 110 are approximately parallel to a machine direction. In some embodiments, the major axis of one or more of the first and second shafts 108 and 110 are not parallel to a machine direction. In some embodiments, the major axis of one or more of the first and second shafts 108 and 110 extend along a machine direction.

The direction of the major axis of the first shaft 108 and the second shaft 110 can be defined by an upstream axial space $S_u$ between the first shaft 108 and second shaft 110 and a downstream axial space $S_d$ between the first shaft 108 and second shaft 110. The upstream axial space $S_u$ is the distance between the shafts as measured from the root of the first shaft 108 at the first upstream mount 820 and the root of the second shaft 110 at the second upstream mount 830. The downstream axial space $S_d$ is the distance between the shafts as measured from the root of the first shaft 108 at the first downstream mount 822 and the root of the second shaft 110 at the second downstream mount 832. In some embodiments, the downstream axial space $S_d$ has a length equal to the length of the upstream axial space $S_u$. In some embodiments, the downstream axial space $S_d$ has a length greater than the length of the upstream axial space $S_u$. In some embodiments, the downstream axial space $S_d$ has a length less than the length of the upstream axial space $S_u$.

In some embodiments, the axial spacing between the first shaft 108 and the second shaft 110 is such that the rotational path of one or more fingers of the first shaft 108 overlap in the machine direction with the rotational path of one or more fingers of the second shaft 110. In some embodiments, the axial spacing between the first shaft 108 and the second shaft 110 is such that the rotational path of all fingers of the first shaft 108 overlap in the machine direction with the rotational path of all fingers of the second shaft 110. In some embodiments, the axial spacing between the first shaft 108 and the second shaft 110 is such that the rotational path of one or more fingers of the first shaft 108 do not overlap in the machine direction with the rotational path of one or more fingers of the second shaft 110. In some embodiments, the axial spacing between the first shaft 108 and the second shaft 110 is such that the rotational path of all fingers of the first shaft 108 do not overlap in the machine direction with the rotational path of one or more fingers of the second shaft 110.

The first and second rotational shafts 108 and 110 can be movably mounted to the upstream and downstream mounting structures 116 and 118. Some or all the first upstream mount 820, the second upstream mount 830, the first downstream mount 822, and the second downstream mount 832 can be configured to move. In some embodiments, the first upstream mount 820 can move relative to the upstream mounting structure 116. In some embodiments, the second upstream mount 830 can move relative to the upstream mounting structure 116. In some embodiments, the first downstream mount 822 can move relative to the downstream mounting structure 118. In some embodiments, the second downstream mount 832 can move relative to the downstream mounting structure 118.

In some embodiments, some or all the first upstream mount 820, the second upstream mount 830, the first downstream mount 822, and the second downstream mount 832 can be selectively displaced. In some embodiments, some or all the first upstream mount 820, the second upstream mount 830, the first downstream mount 822, and the second downstream mount 832 can reversibly move into an operating position. In some embodiments, some or all of the first upstream mount 820, the second upstream mount 830, the first downstream mount 822, and the second downstream mount 832 can be selectively displaced in response to a certain condition. In some embodiments, some or all of the first upstream mount 820, the second upstream mount 830, the first downstream mount 822, and the second downstream mount 832 can reversibly move into an operating position in response to the presence of a meat log. In some embodiments, some or all of the first upstream mount 820, the second upstream mount 830, the first downstream mount 822, and the second downstream mount 832 can selectively move to a certain position in response to detecting one or more of the presence, position, orientation, size, and shape of a meat log. Displacement of one or more of the first upstream mount 820, the second upstream mount 830, the first downstream mount 822, and the second downstream mount 832 can be used to cause one or both of the first rotational shaft 108 and the second rotational shaft 110 to be angularly or translationally displaced.

In some embodiments, one or both of the first rotational shaft and the second rotational shaft are selectively displaced to accommodate meat logs of differing sizes. In some embodiments, the first and second rotational shafts are configured to move apart from each other in a cross-machine direction to adapt for larger meat logs. In some embodiments, the first and second rotational shafts are configured to move apart from each other in a cross-machine direction to adapt for smaller meat logs. In some embodiments, the first and second rotational shafts are configured to move upwardly from a conveying mechanism to adapt for larger meat logs. In some embodiments, the first and second rotational shafts are configured to move downwardly toward a conveying mechanism to adapt for smaller meat logs. In some embodiments, one or both of the first rotational shaft and the second rotational shaft are configured to move independently from one another to accommodate meat logs having eccentric geometry or an eccentric position on a conveying mechanism. In some embodiments, one or both of the first rotational shaft and the second rotational shaft are configured to be selectively displaced to cause a varying shredding action on meat material, such as to increase the irregularity in meat chunks formed by a meat processing system. Movement or displacement of the rotational shafts can be controlled by a motion controller. A motion controller can cause rotational shafts to be displaced according to programmed instructions.

Figure 9:
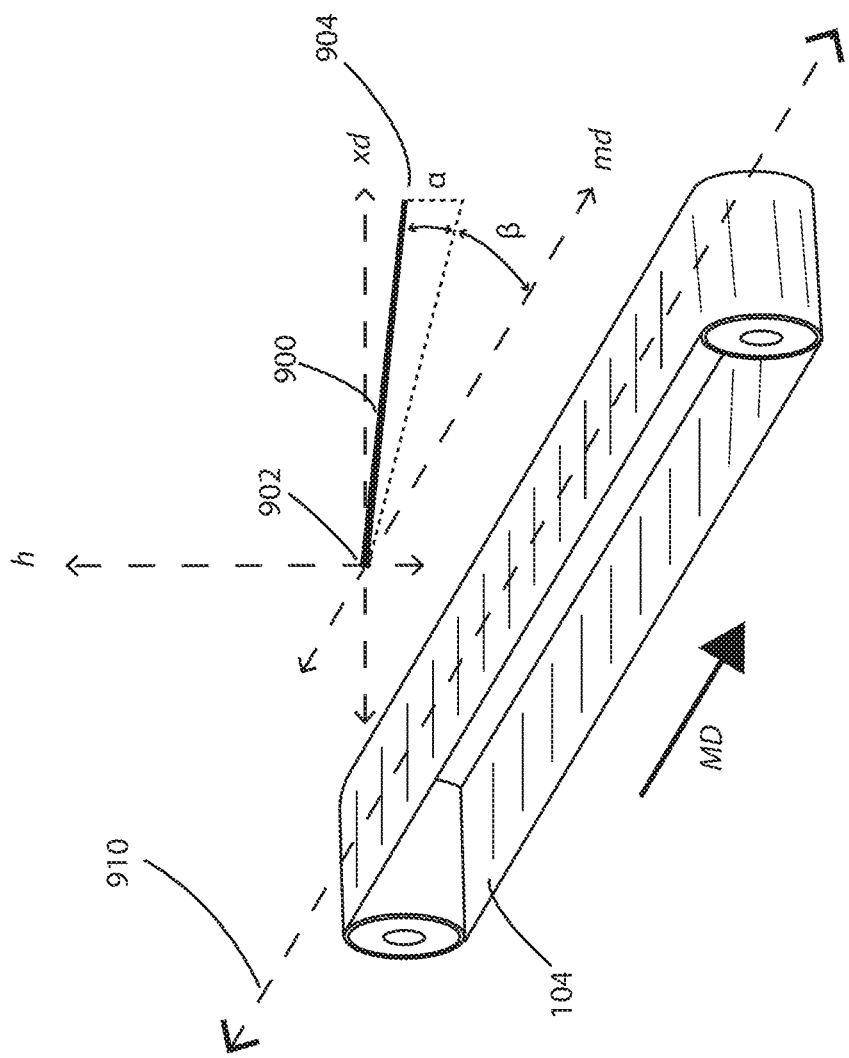
FIG. 9 is a schematic perspective view of a meat shredding system in accordance with various embodiments herein.

Referring now to FIG. 9, a schematic view is shown of a major axis 900 of a shredding mechanism shaft and a conveying mechanism 104. The major axis 900 has an upstream end 902 and a downstream end 904. The major axis 900 is shown with a local coordinate system to illustrate the various angular orientations a shaft can have relative to a conveying mechanism. The coordinate system is centered about the upstream end 902 of the major axis 900. The coordinate system has axes representing a machine direction md, a cross-machine direction xd, and a height direction h. The machine direction md runs along a machine direction MD of the conveying mechanism 104.

In some embodiments, the major axis 900 extends parallel to the machine direction md. In some embodiments, the major axis 900 extends generally along the machine direction md. FIG. 9 shows a major axis 900 extending generally along the machine direction md and having an angular offset from the machine direction md. An angular offset can be defined by an elevation angle $\alpha$ and a sweep angle $\beta$. The elevation angle $\alpha$ is defined by the vertical component of angular offset of the downstream end 904 in the positive height direction h. A positive elevation angle α indicates that the downstream end 904 of the major axis 900 is positioned a further away in the height direction h from the conveying mechanism 104 than the upstream end 902. A negative elevation angle α indicates that the upstream end 902 of the major axis 900 is positioned a further away in the height direction h from the conveying mechanism 104 than the downstream end 904. The sweep angle β is defined by the horizontal component of angular offset of the downstream end 904 in an outward cross-machine direction xd. A positive sweep angle β indicates that the downstream end 904 of the major axis 900 is positioned a further away in the cross-machine direction xd from a centerline 910 of the conveying mechanism 104 than the upstream end 902. A negative sweep angle β indicates that the upstream end 902 of the major axis 900 is positioned a further away in the cross-machine direction xd from a centerline 910 of the conveying mechanism 104 than the downstream end 904.

In some embodiments, the major axis 900 of a shaft can extend along the machine direction md such that the major axis 900 is in closer angular alignment with the machine direction md than other directions. For example, a major axis 900 can extend along the machine direction such that its elevation angle α is less than 45 degrees and its sweep angle β is less than 45 degrees. In some embodiments, the major axis 900 of a shaft extends in a direction having an elevation angle α in a range corresponding to the following elevation angles α, wherein each number can be define the upper or lower boundary of the range: 0 degrees, 1 degree, 2 degrees, 2.5 degrees, 5 degrees, 10 degrees, 15 degrees, 20 degrees, 25 degrees, 30 degrees, 35 degrees, 40 degrees, less than 45 degrees, 45 degrees, greater than 45 degrees, −1 degree, −2 degrees, −2.5 degrees, −5 degrees, −10 degrees, −15 degrees, −20 degrees, −25 degrees, −30 degrees, −35 degrees, −40 degrees, less than −45 degrees, −45 degrees, greater than −45 degrees. In some embodiments, the major axis 900 of a shaft extends in a direction having a sweep angle α in a range corresponding to the following sweep angles β, wherein each number can be define the upper or lower boundary of the range: 0 degrees, 1 degree, 2 degrees, 2.5 degrees, 5 degrees, 10 degrees, 15 degrees, 20 degrees, 25 degrees, 30 degrees, 35 degrees, 40 degrees, less than 45 degrees, 45 degrees, greater than 45 degrees, −1 degree, −2 degrees, −2.5 degrees, −5 degrees, −10 degrees, −15 degrees, −20 degrees, −25 degrees, −30 degrees, −35 degrees, −40 degrees, less than −45 degrees, −45 degrees, greater than −45 degrees.

In some embodiments, the shafts of a shredding mechanism each have the same vertical angular displacement as defined by the elevation angle α. In some embodiments, the shafts of a shredding mechanism each have different vertical angular displacements as defined by elevation angles α. In some embodiments, the shafts of a shredding mechanism each have the same horizontal angular displacement from the centerline of a conveying mechanism, as defined by the sweep angle β. In some embodiments, the shafts of a shredding mechanism each have different horizontal angular displacements from the centerline of a conveying mechanism, as defined by sweep angles β. In some embodiments, the shafts of a shredding mechanism each have the same angular displacement.

Cutter Mechanism Configurations

A cutting mechanism disposed downstream from a shredding mechanism is configured to further separate or process meat material that has been processed by a shredding mechanism. In some embodiments, a cutting mechanism includes an elongated cutting blade. An elongated cutting blade is configured to rotate about a pivot having a major axis. An elongated cutting blade can rotate toward meat material disposed on a conveying mechanism. An elongated cutting blade can cut into a shredded meat log to break up agglomerated portions of meat material, cut the shredded meat log into halves, or otherwise separate the meat log into meat chunks having an irregular and/or home-made form suitable for use in a downstream process. An elongated cutting blade can be various structures configured to interface with meat. The elongated cutting blade can be configured as one of the meat interface structures described above with reference to FIGS. 7A-7F. An elongated cutting blade can be configured as a straight finger, claw, blunt blade, sharpened blade, scalloped blade, notched blade, or otherwise serrated blade.

In some embodiments, the cutting mechanism includes more than a single blade. In such embodiments, the cutting mechanism can include a cutting wheel. A cutting wheel generally has more than one radially-disposed meat interface structure. In some embodiments, a cutting wheel has one or more banks of radially-disposed meat interface structures. In some embodiments, the cutting blades used on a cutting wheel are all like. In some embodiments, at least some the cutting blades used on a cutting wheel are different. The various cutting blades used can include any or all of the meat interface structured described above with reference to FIGS. 7A-7F. Various combinations of straight finger, claw, blunt blade, sharpened blade, scalloped blade, notched blade, or otherwise serrated blade can be employed by a cutting wheel to mechanically act on a meat log to produce irregular meat chunks. Regular repeating or irregular patterns of finger types can be employed to produce a desired shredding or mechanical separating effect.

A cutting wheel can be modular. A modular cutting wheel can include modular cutting disks and/or spacing disks. Modular cutting disks and spacing disks can be selectively joined to produce a cutting wheel providing a desired interaction with a meat product. Modular cutting disks can be configured with differing numbers, types, combinations, and patterns of blades. A modular cutting wheel can be assembled as a stack of a combination of cutting disks and optionally with spacing disks. A modular cutting wheel can include a single modular cutting disk. In some embodiments, a modular cutting wheel includes more than one modular cutting disk.

Cutting mechanisms generally include at least one meat interfacing component, or cutting blade, that rotates about a major axis. In some embodiments, the one or more cutting blades rotate back-and-forth in a reciprocating manner. In some embodiments, the one or more cutting blades rotate in complete revolutions. In some embodiments, the one or more cutting blades rotate continuously. In some embodiments, the one or more rotating blades rotate intermittently. The average rate of rotation of a cutting blade can be in the range corresponding to the following rotational speeds, wherein each speed can be defined the upper or lower boundary of the range: 0 RPM, 0.1 RPM, 0.5 RPM, 1 RPM, 2 RPM, 5 RPM, 10 RPM, 15 RPM, 20 RPM, 25 RPM, 30 RPM, 60 RPM, or 100 RPM.

As illustrated herein above with reference to FIG. 4, a cutting mechanism can include an elongated cutting blade, a cutting wheel, or combinations thereof. A cutting mechanism is generally positioned adjacent to the conveying mechanism of a meat processing system. In some embodiments, a cutting mechanism is positioned to the side of the conveying mechanism. In some embodiments, a cutting mechanism is positioned adjacent to the end of a conveying mechanism. In some embodiments, a cutting mechanism includes more than one cutting devices. In embodiments having multiple cutting devices, such as a cutting wheel and an elongated cutting blade, cutting devices can be positioned: each adjacent to the same side of a conveying mechanism, each adjacent to opposing sides of a conveying mechanism, each adjacent to the end of a conveying mechanism, and alternately adjacent to a side and adjacent to the end of a conveying mechanism.

Figure 10:
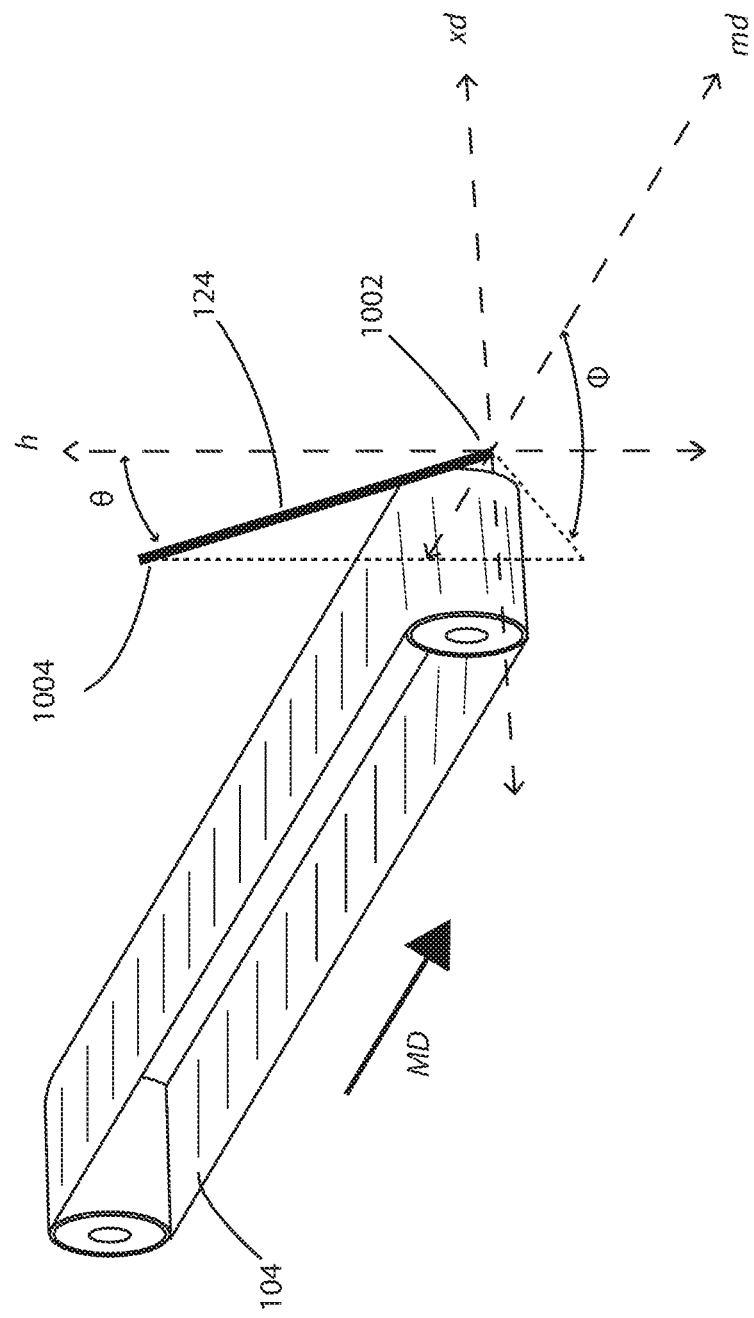
FIG. 10 is a schematic perspective view of a meat cutting system in accordance with various embodiments herein.

Referring now to FIG. 10, a schematic view is shown of a major axis 124 of a cutting mechanism and a conveying mechanism 104. The major axis 124 has a root 1002 and a tip 1004. The major axis 124 is shown with a local coordinate system to illustrate the various angular orientations a cutting mechanism can have relative to a conveying mechanism. The coordinate system is centered about the root 1002 of the major axis 124. The coordinate system has axes representing a machine direction md, a cross-machine direction xd, and a height direction h. The machine direction md runs along a machine direction MD of the conveying mechanism 104.

In some embodiments, the major axis 124 extends parallel to the height direction h. In some embodiments, the major axis 124 extends generally along the height direction h. FIG. 10 shows a major axis 124 extending generally along the height direction h and having an angular offset from the machine direction md. An angular offset can be defined by an azimuth angle $\phi$ and a zenith angle $\theta$. The zenith angle $\theta$ is defined by the vertical component of angular offset of the tip 1004 away from the height direction h. A zenith angle $\theta$ of 0 degrees indicates that the major axis 124 is vertically oriented, or parallel to the height direction h. A nonzero zenith angle $\theta$ indicates that the major axis 124 is not oriented parallel to the height direction h, and has an angular offset from the height direction h. The zenith angle $\phi$ is defined by the component of angular offset of the tip 1004 from the positive machine direction xd.

In some embodiments, the major axis 124 can extend along the height direction h such that the major axis 124 is in closer angular alignment with the height direction h than other directions. For example, a major axis 900 can extend along the machine direction such that its zenith angle $\theta$ is less than 45 degrees. In some embodiments, the major axis 124 can extend along the cross-machine direction xd such that the major axis 124 is in closer angular alignment with the cross-machine direction xd than other directions. For example, a major axis 124 can extend along the cross-machine direction such that its zenith angle $\theta$ is greater than 45 degrees and its azimuth angle $\phi$ is from 45-135 or 225-315 degrees. In some embodiments, the major axis 124 extends in a direction having an azimuth angle $\alpha$ in a range corresponding to the following azimuth angles $\phi$, wherein each number can be define the upper or lower boundary of the range: 0 degrees, 15 degrees, 30 degrees, 45 degrees, 60 degrees, 75 degrees, 90 degrees, 105 degrees, 120 degrees, 135 degrees, 150 degrees, 165 degrees, 180 degrees, 195 degrees, 210 degrees, 225 degrees, 240 degrees, 255 degrees, 270 degrees, 285 degrees, 300 degrees, 315 degrees, 330 degrees, and 345 degrees. In some embodiments, the major axis 124 extends in a direction having a zenith angle $\theta$ in a range corresponding to the following zenith angles $\theta$, wherein each number can be define the upper or lower boundary of the range: 0 degrees, 1 degree, 2 degrees, 2.5 degrees, 5 degrees, 10 degrees, 15 degrees, 20 degrees, 25 degrees, 30 degrees, 35 degrees, 40 degrees, less than 45 degrees, 45 degrees, greater than 45 degrees, 50 degrees, 55 degrees, 60 degrees, 65 degrees, 70 degrees, 75 degrees, 80 degrees, 85 degrees, 87.5 degrees, 88 degrees, 89 degrees, and 90 degrees.

Meat Logs and Meat Chunks

The source of meat material to be processed by the meat processing system is can be a meat log. A meat log can be a continuous or discrete mass of meat material. In some embodiments, a meat log is constructed of whole-muscle meat. In some embodiments, a meat log is constructed of boneless meat. In some embodiments, a meat log is constructed of a ground meat. In some embodiments, a meat log is constructed of a pre-processed meat. In some embodiments, a meat log is constructed of pre-cooked meat. In some embodiments, the meat log is constructed of uncooked meat. In some embodiments, a meat log is constructed of chicken meat material. A meat log can be constructed of a variety of meat products. A meat log can be constructed in whole, in part, or in any combination of: chicken, beef, pork, fish, lamb, goat, shellfish, venison, turkey, goose, and the like.

The meat processing systems disclosed herein transform a mass of source meat material into discrete chunks. The chunks are generally characterized by traits commonly associated with manually-processed meat. Such traits include irregular shapes, or shapes not being geometrically regular. The meat processing the system can produce irregular, shredded three-dimensional shaped pieces of meat. Irregular shapes can be shapes other than triangular prisms, rectangular prisms, or other solid shapes with one or more regular faces. Such traits also include varying sizes. Varying sizes can be defined by a distribution of sizes or masses within certain limits. For example, a meat chunk may have a maximum and minimum acceptable size, and a desirable distribution of sizes within that range. In some embodiments, a meat processing system produces meat chunks having a side or mass distribution having a standard deviation that is large relative to the nominal average value.

In some embodiments, a meat processing system produces meat chunks having a size distribution with a standard deviation that is about a certain proportion of the nominal average size value, the proportion being in the range defined by the following percentages, wherein each can serve as the upper or lower boundary of the range: Above 0%, 0.5%, 1%, 2%, 3%, 4%, 5%, 6%, 7%, 8%, 9%, 10%, 15%, 20%, greater than 20%. In some embodiments, a meat processing system produces meat chunks having a mass distribution with a standard deviation that is about a certain proportion of the nominal average mass value, the proportion being in the range defined by the following percentages, wherein each can serve as the upper or lower boundary of the range: Above 0%, 0.5%, 1%, 2%, 3%, 4%, 5%, 6%, 7%, 8%, 9%, 10%, 15%, 20%, greater than 20%.

Process Parameters

The meat processing system is configured to treat a certain amount of meat material per unit of time. In some embodiments, the throughput of a meat processing system matches the throughput of an existing line process of a meat log source, downstream process, or other related process in the manufacturing environment. In some embodiments, the throughput speed of the meat processing system is adjustable to accommodate different meat log types or degrees of processing required.

In some embodiments, a meat processing system has a throughput speed in a range defined by the following throughput speeds, wherein each can serve as the upper or lower boundary of the range: above 0 kg/minute, 1 kg/minute, 5 kg/minute, 10 kg/minute, 50 kg/minute, 100 kg/minute, 250 kg/minute, 500 kg/minute, 750 kg/minute, 1000 kg/minute, and above 1000 kg/minute.

Adjunct Equipment

Various equipment can be included in meat processing systems in addition to the shredding, cutting, and conveying mechanism disclosed herein. In some embodiments, a meat processing system includes an oven configured to cook meat logs and place them on the conveying mechanism. In some embodiments, a meat processing system includes an extruder assembly configured to extrude meat on to the conveying mechanism. In some embodiments, an oven and an extruder are combined into a single subsystem that extrudes cooked meat to be received by a meat processing system. In some embodiment, such equipment is not included in a meat processing system, but can be used in an upstream or downstream process within the processing environment of a meat processing system.

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The invention claimed is:

1. A system for producing irregular shredded meat pieces from a meat log:
    a conveying mechanism;
    a first rotational shredding shaft positioned adjacent to the conveying mechanism;
    a first plurality of shredding fingers connected to the first rotational shredding shaft;
    a second rotational shredding shaft positioned adjacent to the conveying mechanism;
    a second plurality of shredding fingers connected to the second rotational shredding shaft;
    the first and second rotation shredding shafts configured to rotate in directions opposite from one another; and
    a cutting blade disposed downstream from the first and second rotational shredding shafts.

2. The system of claim 1, the cutting blade comprising a rotating cutting wheel having a plurality of blades mounted thereon.

3. The system of claim 1, the cutting blade comprising a rotating cutting wheel having at least one blade selected from the group consisting of a sharp, blunt, scalloped, or notched blade.

4. The system of claim 1, the cutting blade comprising a side-mounted elongated cutting blade, wherein the side-mounted elongated cutting blade is configured to pivot inward toward the conveyor mechanism.

5. The system of claim 1, wherein the shredding fingers are straight or angled.

6. The system of claim 1, wherein the shredding fingers are sharp or blunt.

7. The system of claim 1, wherein the shredding fingers are scalloped or notched.

8. The system of claim 1, wherein the first and second rotational shredding shafts rotate at a speed of 0.5 to 10 RPM.

9. The system of claim 1, wherein the first plurality of shredding fingers and the second plurality of shredding fingers are configured to shred a meat log disposed on the conveying mechanism as the first and second rotational shredding shafts rotate.

10. The system of claim 1, wherein the first plurality of shredding fingers is axially aligned with the second plurality of shredding fingers.

11. The system of claim 1, wherein the first plurality of shredding fingers is not axially aligned with the second plurality of shredding fingers.

12. The system of claim 1, wherein the first rotational shredding shaft is mounted to a movable structure.

13. A system for producing irregular-shaped meat pieces:
    a conveying mechanism;
    a first rotational shaft extending along a machine direction of the conveying mechanism;
    a first plurality of fingers protruding from the first rotational shaft;
    a second rotational shaft extending along the machine direction of the conveying mechanism;
    a second plurality of fingers protruding from the second rotational shaft;
    the first rotational shaft and the second rotational shaft each configured to rotate in a direction opposite from the other; and
    a rotational cutting mechanism disposed downstream from the first and second rotational shredding shafts, the cutting mechanism configured to rotate in a direction other than along a machine direction of the conveying mechanism.

14. The system of claim 13, the cutting mechanism comprising a rotating cutting wheel having a plurality of blades mounted thereon.

15. The system of claim 13, the cutting mechanism comprising a rotating cutting wheel having at least one blade selected from the group consisting of a sharp, blunt, scalloped, or notched blade.

16. The system of claim 13, the cutting mechanism comprising a side-mounted elongated penetrating rod.

17. The system of claim 13, the cutting mechanism comprising a side-mounted elongated cutting blade.

18. The system of claim 17, wherein the side-mounted elongated cutting blade is configured to pivot inward toward the conveyor belt.

19. A system for producing irregular shredded meat pieces from a meat log:
    a conveying mechanism;
    a first shaft;
    a first plurality of fingers connected to the first shaft;

a second shaft;

a second plurality of fingers connected to the second shaft;

the first and second shafts configured to rotate such that the first plurality of fingers and the second plurality of fingers diverge in a cross-machine direction at a shredding position adjacent to the conveying mechanism; and a cutting mechanism disposed downstream from the first and second shafts, the cutting mechanism configured to cut irregular meat pieces from a shredded meat log.

20. The system of claim 19, the cutting mechanism comprising a side-mounted elongated penetrating rod.

* * * * *